United States Patent
Takada et al.

[19]

[11] Patent Number: 6,020,090
[45] Date of Patent: Feb. 1, 2000

[54] METHOD FOR PRODUCING TRANSPARENT TYPE HOLOGRAM

[75] Inventors: Kenichiro Takada, Kuwana; Katsuyoshi Nishii, Okazaki; Satoshi Koike, Kariya; Kazumasa Kurokawa, Kariya; Masahiro Shiozawa, Nishio; Tomoyuki Kanda, Mie, all of Japan

[73] Assignees: Denso Corporation, Aichi-Pref; Nippon Soken, Inc., Nishio, both of Japan

[21] Appl. No.: 08/923,667

[22] Filed: Sep. 4, 1997

[30] Foreign Application Priority Data

Sep. 5, 1996 [JP] Japan ................................. 8-257588
Sep. 2, 1997 [JP] Japan ................................. 9-254346

[51] Int. Cl.[7] ............................................ G03H 1/04
[52] U.S. Cl. ............................... 430/1; 359/30; 359/1; 359/35; 430/2
[58] Field of Search ............................... 430/1, 2; 359/1, 359/3, 11, 30, 31, 13, 35

[56] References Cited

U.S. PATENT DOCUMENTS

| | | | |
|---|---|---|---|
| 3,578,837 | 5/1971 | Brooks | 359/28 |
| 3,614,234 | 10/1971 | Heflinger | 359/28 |
| 3,635,540 | 1/1972 | Nassenstein | 430/1 |
| 3,677,616 | 7/1972 | Lewis | 359/28 |
| 3,680,943 | 8/1972 | Ogden et al. | 359/28 |
| 3,680,944 | 8/1972 | Ernst et al. | 359/28 |
| 3,838,903 | 10/1974 | Leith et al. | 359/28 |
| 4,427,265 | 1/1984 | Suzuki et al. | 359/599 |
| 4,602,843 | 7/1986 | Glaser-Inbari | 369/15 |
| 5,016,950 | 5/1991 | Smith | 369/15 |
| 5,046,793 | 9/1991 | Hockley et al. | 359/599 |
| 5,347,376 | 9/1994 | Chen et al. | 359/28 |

FOREIGN PATENT DOCUMENTS

| | | | |
|---|---|---|---|
| 0349884 | 1/1990 | European Pat. Off. | |
| 2640772 | 6/1990 | France | |
| 2732843 | 2/1978 | Germany | |
| 3919834 | 12/1990 | Germany | 359/599 |
| 55-89806 | 7/1980 | Japan | 359/599 |
| 8-030184 | 1/1986 | Japan | |
| 4-298710 | 10/1992 | Japan | |
| 5-85910 | 12/1993 | Japan | |
| 0866534 | 9/1981 | U.S.S.R. | 359/28 |
| 1282716 | 7/1972 | United Kingdom | 359/19 |

*Primary Examiner*—Martin Angebranndt
*Attorney, Agent, or Firm*—Pillsbury Madison & Sutro, LLP

[57] ABSTRACT

Method for producing a of a transparent type hologram screen of an wide visible range. A photosensitive member and a light source of a reference light are arranged on the same side of the light diffusing body. A light source of an object light is arranged on the opposite side of the light diffusing body, so that the light is transmitted through the light diffusing body to generate a object light. A light from a light source of a reference light is reflected at the light diffusing body or a member such as a half mirror or a transparent, reflective hologram element arranged at a front side of the light diffusing body.

13 Claims, 25 Drawing Sheets

METHOD FOR PRODUCING TRANSPARENT TYPE HOLOGRAM

BACKGROUND OF THE INVENTION

1. Field of the Invention

The present invention relates to a method for producing a hologram of a light transparent type, and more particularly, to a method for producing a hologram capable of increasing a visible area during reproduction.

2. Description of Related Art

Known in the prior art is a hologram screen, where a light emitted from an indicator is irradiated onto a transparent screen on which a hologram is formed so that a recorded image is viewed on the screen. The transparency of the hologram allows the background to be viewed through the screen by the viewer. Thus, it is possible that this type of a hologram can be used at a customer counter of a bank or a hospital so that information about a customer or a patient is projected on the screen, while a receptionist sees the customer or the patient through the transparent screen.

Such an arrangement of the hologram may also be employed at an automobile retailer, where an advertising reproduction image is seen by a customer.

Furthermore, an application is also possible as a heads-up display for an automobile, which allows a driver to see a hologram image of various information such as vehicle speed in front of the windshield.

A light transparent type hologram screen is known, where a projector is arranged at a backside of a hologram screen so that a reference light is issued from the projector. A real image is created on the hologram screen, from which a diffraction light is diffracted, while the image is viewed by a viewer.

In order to produce such a hologram screen, a method is known where a light is passed through a light diffusing body such as a frosted glass plate to obtain diffuse light as an object light (signal wave), which works with non-diffuse light as a reference light (reference wave), so that an interference fringe is created on a photo-sensitive member.

It is, of course, desirable that the hologram screen has as wide a visible area as possible so that a viewer can view the hologram screen at various locations. In order to widen the visible area of the hologram screen, it is necessary to increase the expansion angle of the object light introduced into the photo-sensitive member by, for example, increasing the size of the light diffusion body or locating the light diffusion body adjacent to the photo-sensitive member.

However, production of a transparent type hologram screen of an increased visual range is difficult because the increased incident angle of the object light causes the reference light to be blocked by the light diffusing body, which prevents the photosensitive member from being illuminated by the reference light.

SUMMARY OF THE INVENTION

An object of the present invention is to provide a method for producing a hologram screen for a transparent type display system capable of overcoming the above mentioned difficulty in the prior art.

Another object of the present invention is to provide a method for producing a hologram screen for a transparent type display system capable of obtaining an increased visible area.

According to a general aspect of the invention, a method is provided for producing a transparent type hologram screen as a hologram produced on a photosensitive member illuminated, on one side, by a diffuse light and a non-diffuse light. The method includes positioning a light diffusing body on one side of the photosensitive member;

introducing a first light that passes through the light diffusing body, thereby generating a diffuse light, which is introduced into the photosensitive member as an object light;

introducing a second light as a divergent light to the photosensitive member as a reference light; and providing means for preventing the second light from being blocked by the light diffusing body, while keeping a desired incident angle between the object light and the photosensitive member.

According to a first embodiment of the invention, a method is provided for producing a transparent type hologram screen as a hologram produced on a photosensitive member illuminated, on one side, by a diffuse light and a non-diffuse. The method includes positioning a first light path of a reference light and a photosensitive member on one side of a light diffusing body, while positioning a second light path of an object light on the opposite side of the light diffusion body, introducing, via the second light path, a light that passes through the light diffusing body, thereby generating a diffuse light as an object light, and introducing, via the first light path, a light subject to a regular reflection at the light diffusing body to provide a reflected light as a reference light.

As a result of this structure, a hologram screen for a transparent type display system of an increased visible area can be produced.

According to a first embodiment of the invention (FIG. 4), the light is partly subject to a regular reflection at the light diffusing body without being scattered so that the reflected light becomes a reference light, while the diffuse light is passed through the light diffusing body and is combined with the remaining part of the light scattered at the light diffusing body, which forms an object light.

In the first embodiment, a light source of the object light and a light source of the reference light are arranged on opposite sides of the light diffusing body. Thus, an increase in the expansion angle (α in FIG. 2) of the diffuse light introduced into the photosensitive member is possible, while keeping the photosensitive member illuminated by the reference light along its entire surface. In other words, an increase in the size of the light diffusing body to increase the expansion angle of the object light is possible while preventing the light path of the reference light from being blocked.

Furthermore, the light diffusing body can be located closer to the photosensitive member to increase the expansion angle of the object light, while a blockage of the light path of the reference light is less likely over the arrangement in the prior art.

According to a second embodiment of the invention, a method is provided for producing a transparent type hologram screen as a hologram produced on a photosensitive member illuminated, on one side, by a diffuse light and a non-diffuse light. The method includes positioning a first light path of a reference light and a photosensitive member on one side of a light diffusing body, while positioning a second light path of an object light on the opposite side of the light diffusion body;

positioning a half mirror between the light diffusing body and the photosensitive member;

introducing, via the second light path, a light that passes through the light diffusing body and the half mirror, thereby generating a diffuse light as the object light; and introducing, via the first light path, a light subject to a reflection from its upstream side at the half mirror to provide a reflected light as the reference light.

According to a second embodiment of the invention (FIG. 5), similar to the first embodiment, the light source of the object light and the reference light are arranged on opposite sides of the light diffusing body. Thus, the increase in the expansion angle of the object light introduced into the photosensitive member is obtained, while the photosensitive member is illuminated along its entire surface by the reference light, thereby producing a hologram screen of an increased visible range.

Furthermore, the arrangement of the half mirror between the light diffusing body and the photosensitive member allows the amount of regularly reflected light to be increased, thereby increasing the strength of the reference light. On the other hand, the strength of the object light may be reduced due to the fact that a light may be reflected at the half mirror. Thus, adjustment of the optical characteristic of the half mirror allows the ratio of light strength to be adjusted between the object light and the reference light.

In a third embodiment of the invention, a method is provided for producing a transparent type hologram screen as a hologram produced on a photosensitive member illuminated, on one side, by a diffuse light and a non-diffuse light. The method includes positioning a first light path of a reference light and a photosensitive member on one side of a light diffusing body, while positioning a second light path of an object light on the opposite side of the light diffusion body;

positioning a transparent Lippmann type hologram element between the light diffusing body and the photosensitive member for regenerating a non-diffuse light;

introducing, via the second light path, a light that passes through the light diffusing body and the Lippmann type hologram element, thereby generating a diffuse light as the object light; and introducing, via the first light path a light subject to a reflection from its upstream side at the Lippmann type hologram element to provide a reflected light as the reference light.

In the third embodiment (FIG. 6), similar to the first embodiment, the expansion angle of the object light to the photosensitive member is increased while the photosensitive member is illuminated by the reference light along its entire surface. Furthermore, a Lippmann type hologram element is arranged between the light diffusing body and the photosensitive member so that an increase in the regularly reflected light is obtained, thereby increasing the strength of the reference light. Furthermore, an adjustment of the characteristic of the Lippmann type hologram allows the strength ratio to be adjusted between the reference light and the object light.

According to a fourth embodiment of the invention, a method is provided for producing a transparent type hologram screen as a hologram produced on a photosensitive member illuminated, on one side, by a diffuse light and a non-diffuse light. The method includes positioning, in light paths for a reference light and an object light, a transparent light diffusion body;

introducing, via one light path, a light that passes through the light diffusing body, thereby generating a diffuse light as the object light; and introducing, via another light path, a light that passes through the light diffusing body, thereby generating a non-diffuse light as the reference light.

In the fourth embodiment (FIG. 8), the light source of the object light and the light source of the reference light are located on the same side of the light diffusing body so that the both of the lights pass through the light diffusing body. Thus, an increase in the expansion angle of the object light is possible, while the photosensitive member is illuminated by the reference light over its entire surface. Thus, a production of the hologram screen of an increased visible area is possible.

According to a fifth embodiment of the invention, a method is provided for producing a transparent type hologram screen as a hologram produced on a photosensitive member illuminated, on one side, by a diffuse light and a non-diffuse light. The method includes positioning, in light paths for a reference light and an object light, a transparent light diffusion body having directivity so that only light in a predetermined range of an incident angle is diffused;

introducing, via one light path, a light at an angle within the predetermined incident angle range that passes through the light diffusing body, thereby generating a diffuse light as the object light; and introducing, via another light path, a light at an angle outside the predetermined incident angle range that passes through the light diffusing body, thereby generating a non-diffuse light as the reference light.

In the fifth embodiment, an increased visible area, similar to the fourth embodiment, is obtained. Furthermore, in the fifth embodiment, the light sources for the object and reference lights are separate which makes it easy to adjust the intensity ratio between the reference light and the object light.

According to a sixth embodiment of the invention, a method is provided for producing a transparent type hologram screen as a hologram produced on a photosensitive member illuminated, on one side, by a diffuse light and a non-diffuse light. The method includes positioning, in light paths for a reference light and an object light, a Fresnel type hologram element on which a light diffusion body is recorded, the Fresnel type hologram element being produced, first, by illuminating a photosensitive plate from one side by a divergent light as a reference light and a diffuse light as an object light for generating a hologram and, then, by shaping the plate in a curved shape curving toward the light path in the incident direction of the reference and object lights;

positioning the light sensitive element on the side of a center of a curvature of the curved shape;

introducing, via one light path, a light that passes through the Fresnel type hologram element, thereby generating a diffuse light as the object light; and introducing, via another light path, a light that passes through the Fresnel type hologram element, thereby generating a non-diffuse light as the reference light.

In the sixth embodiment (FIG. 10), the Fresnel type hologram element is formed with a convex surface, which is projected toward the light sources of the reference and object lights, while the photosensitive member is arranged at the side of the center of the curvature of the curve. As a result, the diffuse light as the object light from a peripheral portion of the hologram element is introduced obliquely to the photosensitive member, thereby increasing the expansion angle of the object light. Namely, in comparison with a hologram element of a flattop, the curved shape of the hologram element allows the diffuse light to be directed toward the center of the curvature, thereby increasing the expansion angle of the object light and making it possible to produce a hologram screen of an increased visible area.

According to a seventh embodiment of the invention, a method is provided for producing a transparent type hologram screen as a hologram produced on a photosensitive member illuminated, on one side, by a diffuse light and a non-diffuse light. The method includes positioning, in a light path for a reference light, a Lippmann type hologram element on which a light diffusion body is recorded, the Lippmann type hologram element being produced, first, by illuminating a photosensitive plate from opposite sides by a reference light and an object light to generate a hologram and, then, by shaping the photosensitive plate in a curved shape curving toward the light path in the incident direction of the object light;

positioning the photosensitive member on the side of the center of the curvature of the curved shape, while positioning the light path for the object light on the side of the Lippmann type hologram element opposite to the side where the light path for the reference light is located;

introducing, via one light path, a light that is diffracted and reflected by the Lippmann type hologram element, thereby generating a diffuse light as the object light by which the photosensitive member is illuminated; and introducing, via another light path, a light that passes through the Lippmann type hologram element, thereby generating a non-diffuse light as the reference light which illuminates the photosensitive member.

The seventh embodiment (FIG. 12) has similar effects as those of the sixth embodiment. Namely, the position of the light source of the object light of the Lippmann type hologram element is different from that of the Fresnel type hologram element. However, a similar arrangement is obtained for the introduction of the object and reference lights with respect to the photosensitive member, and thus the function is substantially unchanged.

According to an eighth embodiment of the invention, a method is provided for producing a transparent type hologram screen as a hologram produced on a photosensitive member illuminated, on one side, by a diffuse light and a non-diffuse light. The method includes positioning, in a light path for an illuminating light, a first transparent hologram element, and a second transparent hologram element, the first hologram element being a Lippmann type hologram element on which a light diffusion body is recorded and having an incident surface for a hologram reproduction directed toward the photosensitive member, while the first hologram element is located on the side adjacent to the light source over the second hologram element, the second hologram element being a Lippmann type hologram on which a plane mirror is recorded, the second hologram having an incident surface for a hologram reproduction which is opposite the photosensitive member, while the second hologram element is located on the side adjacent to the photosensitive member; and introducing, via the first and second holograms, a light that partly passes through the first and second holograms without being diffused to form a reference light, the light being partly, after transmission through the first hologram element, diffracted and reflected at the second hologram element to the first hologram element, where the light is further diffracted to form a reflected light, which becomes an object light, thereby producing a hologram screen by a single light beam.

In the eighth embodiment (FIG. 14), an increase in the size of the hologram element as a light diffusing body may cause the expansion angle of the object light to be easily increased. Furthermore, location of the light diffusing body closer to the photosensitive member also causes the expansion angle of the object light to be increased. Thus, production of a hologram screen of an increased visible area is possible.

According to a ninth embodiment of the invention, a method is provided for producing a transparent type hologram screen as a hologram produced on a photosensitive member illuminated, on one side, by a diffuse light passed through a light diffusing body and a non-diffuse light. The method includes introducing a light that passes through the light diffusing body, thereby generating a diffuse light as an object light;

introducing a light directly to the photosensitive member without passing through the light diffusion body;

providing a reflective optical element located at the end of the light diffusion body on the side where the reference light is introduced into the photosensitive member, the reflective optical element being extended from the end toward the photosensitive member so that light introduced at an angle opposite to the angle where the reference light forms with respect to a normal line to the light incident surface of the photosensitive member is deflected to a direction of the photosensitive member; and a part of the diffuse light passed through the light diffusing body is partly reflected at the reflective optical element so that the reflected light is directed to the photosensitive member.

In the ninth embodiment (FIG. 16), the reflective optical element is projected from the end of the light diffusing body to the photosensitive member so that the diffuse light passed through the light diffusing body is reflected toward the photosensitive member. Furthermore, an operation for generating an object light is identical to the case where the end of the light diffusing body is extended. Thus, an increase in the expansion angle of the object light is obtained, while preventing the reference light from being blocked by the light diffusing body. Thus, a hologram screen of an increased visible area is obtained.

In a tenth embodiment of the invention, the reflective optical element is partly transparent so light is partly passed therethrough, part of the diffuse light passing through the light diffusing body is reflected at the reflective optical element and then introduced into the photosensitive member, while the light from the source of the reference light passed through reflective optical element is partially or entirely introduced into the photosensitive member.

In the tenth embodiment, the reflective optical element can transmit the incident light which increases the freedom of arrangement of the reference light. Thus, the expansion angle of the object light can be increased, thereby easily producing a hologram screen of an increased visible range.

According to an eleventh embodiment of the invention, a method is provided for producing a transparent type hologram screen as a hologram produced on a photosensitive member illuminated, on one side, by a diffuse light passed through a light diffusing body and a non-diffuse light. The method includes introducing a light that passes through the light diffusing body, thereby generating a diffuse light as an object light;

introducing a divergent light directly to the photosensitive member without passing through the light diffusion body, as a reference light; and providing a convex lens at a front surface of the photosensitive member, thereby increasing an incident angle of the photosensitive member.

In the eleventh embodiment (FIG. 41), the same results are obtained as when the size of the light diffusing body is increased or the light diffusing body is located closer. Thus, a hologram screen of an increased visible area is produced. In this invention, the reference light is usually passed through the convex lens. Thus, a some measure is necessary compensate for an increase in the divergence angle of the reference light.

According to a twelfth embodiment of the invention, a method is provided for producing a transparent type hologram screen as a hologram produced on a photosensitive member illuminated, on one side, by a diffuse light passing through a light diffusing body, and a non-diffuse light. The method includes introducing a light that passes through the light diffusing body, thereby generating a diffuse light as an object light;

introducing a divergent light directly to the photosensitive member without passing through the light diffusion body, as a reference light; and providing an object lens on a small opening on the light diffusing body so that the object light is formed by a divergent light passed through the object lens.

In the twelfth embodiment (FIG. 42), the light source of the reference light is formed as a beam, which is passed through the lens for generating a divergent reference light. Thus, the reference light is substantially prevented from being weakened by the light diffusing body. Thus, loss of the reference light is reduced, design of the light path is easy, and sufficient reference light is easy to provide. In particular, in the case where the divergence point of the reference light is located close to the photosensitive member, i.e., the light source of the projecting light of the screen is located close to the screen, it is possible that the light diffusing body is located closer to the photosensitive member. Thus, a hologram screen of an increased visible area can be easily produced.

According to a thirteenth embodiment of the invention, a method is provided for producing a transparent type hologram screen as a hologram produced on a photosensitive member illuminated, on one side, by a diffuse light passed through a light diffusing body and by a non-diffuse light. The method includes introducing a light that passes through the light diffusing body for generating a diffuse light as an object light;

introducing a divergent light as a reference light directly to the photosensitive member without passing through the light diffusion body; and providing a Fresnel type hologram element in front of the photosensitive member so that the angle of the diffracted light with respect to the normal line of the outlet surface of the diffracted light is less than the angle of the illuminated light with respect to the normal line of the inlet surface.

In the thirteenth embodiment (FIG. 32), the Fresnel type hologram element is provided so that the incident divergent light is diffracted to a divergent light. Thus, an increase in the incident angle of the reference light is obtained, thereby increasing the size of the light diffusing body, resulting in an increase in the visible area of the hologram screen.

According to a fourteenth embodiment of the invention, a method is provided for producing a transparent type hologram screen as a hologram produced on a photosensitive member illuminated, on one side, by a diffuse light passed through a light diffusing body and a non-diffuse light. The method including introducing a light that passes through the light diffusing body, thereby generating a diffuse light as an object light;

introducing a divergent light directly to the photosensitive member without passing through the light diffusion body, as a reference light; and providing a Fresnel type hologram element adjacent to the end of the light diffusing body adjacent to the side where the reference light is introduced into the photosensitive member, the Fresnel type hologram element being projected from the light diffusing body to the photosensitive member, the arrangement of the Fresnel type hologram element being such that the reference light introduced into the Fresnel type hologram element is diffracted toward the photosensitive member.

In the fourteenth embodiment (FIG. 33), by adjusting the characteristic of the Fresnel type hologram element, the incident angle or an aperture angle of the reference light during the hologram formation and the projecting direction or aperture angle during the hologram reproduction can be suitably adjusted. In relation to this, the degree of freedom of a setting of a optical system for the object light is also increased, thereby increasing a range of the incident angle of the object light, resulting in an increase in the visible range of the hologram screen.

In a fifteenth embodiment of the invention, a method is provided for producing a transparent type hologram screen as a hologram produced on a photosensitive member illuminated, on its front side, by a diffuse light passed through a light diffusing body and a non-diffuse light. The method includes introducing a light that passes through the light diffusing body, thereby generating a diffuse light as an object light;

introducing a divergent light directly to the photosensitive member without passing through the light diffusion body;

providing a Fresnel type hologram element at a front surface of the photosensitive member, on which a light diffusion body is recorded having directivity that allows a first light in the direction of the divergent light to pass straight through, while a second incident light from a different direction is diffused;

the reference light being constructed by the divergent light passed through the Fresnel type hologram element;

the object light being constructed by the first object light which is a diffuse light passed through the light diffusing body and then through the Fresnel type hologram element and a second object light which is the diffuse light passed through the light diffusing body and diffracted at the Fresnel type hologram element.

In the fifteenth embodiment (FIG. 34), the diffuse light is constructed by the first diffuse light (first object light) as generated by the light diffusing body and passed through Fresnel type hologram element and a second diffuse light (second object light) as generated by the Fresnel type hologram element. Providing a second diffuse light functions as if there has been an increase in the incident angle of the object light. Namely, an effect is obtained, that is equivalent to the one obtained when the size of the light diffusion body is spatially increased. Thus, a hologram screen of an increased visible area can be obtained.

According to a sixteenth embodiment of the invention, a method is provided for producing a transparent type hologram screen as a hologram produced on a photosensitive member illuminated, on one side, by a diffuse light passed through a light diffusing body and a non-diffuse light. The method includes introducing a light that passes through the light diffusing body, thereby generating a diffuse light as an object light;

introducing a divergent light directly to the photosensitive member without passing through the light diffusion body; and providing a prism between the light sources of the reference and the object lights, the prism having boundaries of a desired respective characteristic for reflection or transparency such that the direction of the diffuse light passed through the light diffusion body is changed at the corresponding boundary of the prism to a desired direction as the object light, while the divergent light is deflected to a desired direction at the corresponding boundary of the prism as the reference light.

In the sixteenth embodiment (FIG. 36), the use of the prism allows the light path and the light strength to be suitably adjusted. For example, by varying the apex angle of the prism or angle between the boundaries of the prism a desired direction of the deflection of the light is obtained. Furthermore, an adjustment of the reflectivity as well as a degree of the transmission at the boundary allows that the strength of the light to the photosensitive member to vary. Namely, the shape of the prism and a coating on the desired boundary allow the direction of the light and the strength to be adjusted. Thus, the degree of freedom of the direction of the reference light to the photosensitive member is increased so that the incident angle of the object light onto the photosensitive member can be increased. Thus, a hologram screen of an increased visible area can be easily produced.

DETAILED DESCRIPTION OF PREFERRED EMBODIMENTS

Figure 1:
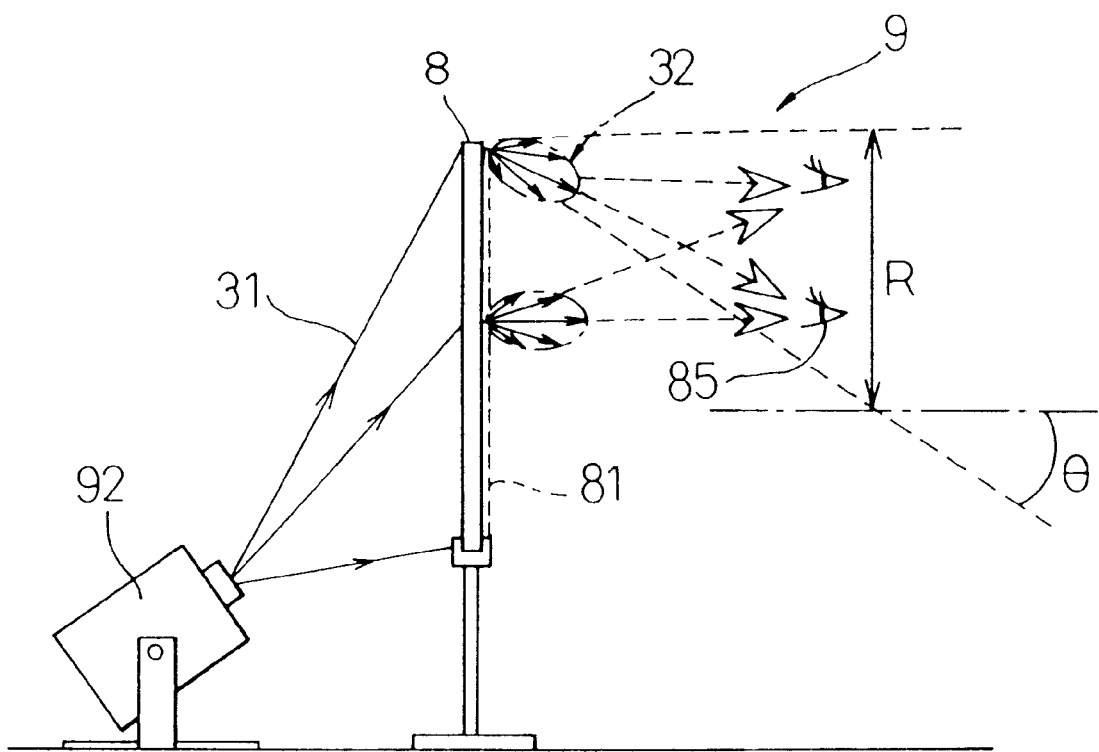
FIG. 1 is a schematic view of a display system using a hologram screen according to present invention.

FIG. 1 shows schematically a display system to which the present invention is applied.

Namely, a reference numeral 8 is a transparent type hologram screen which is to be produced in accordance with the method of the present invention. A projector 92 is arranged at aback side of the hologram screen 8, in such a manner that a reference light 31 from the projector 92 is emitted. A real image 81 is created on the hologram screen 8, from which a diffraction light 32 is diffracted, while the image 81 is viewed by a viewer 85.

Figure 2:
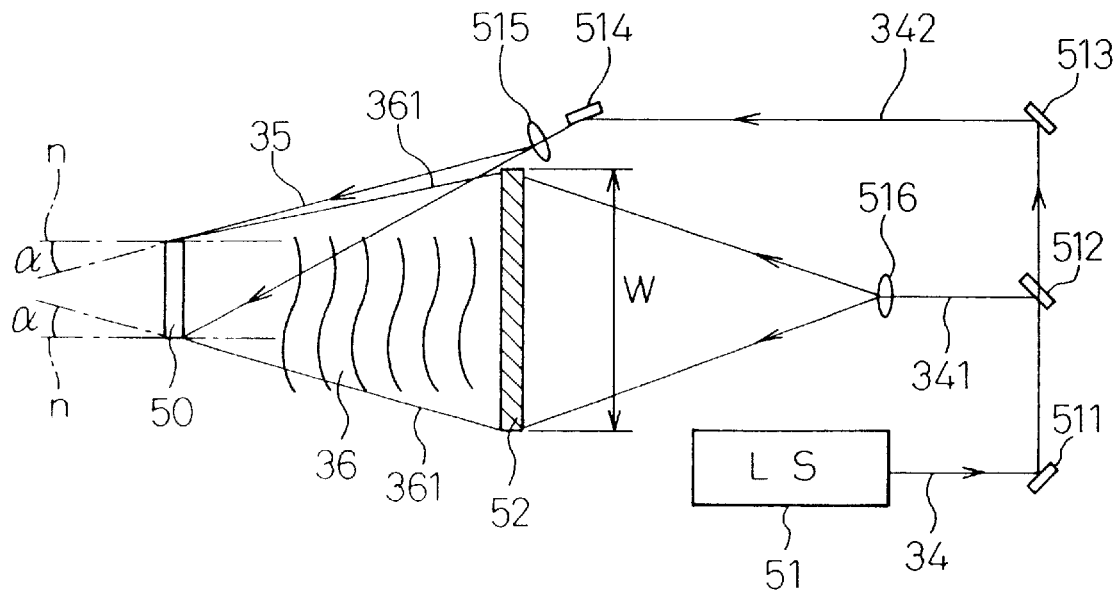
FIG. 2 is a schematic view illustrating a method for producing a transparent type hologram screen in the prior art.

FIG. 2 schematically illustrates a conventional system for production of the hologram screen of a transparent type used for the display system in FIG. 1. A reference numeral 51 denotes a coherent light source such as a laser device. A coherent light 34 from the laser light source 51 is, after a change in direction at a mirror 511, introduced into a half mirror 512, where the light is divided into beams 341 and 342. The first beam 341 is, after being diverted at a lens 516, passed through a light diffusion body 52, thereby providing a diffuse light as an object light 36 when irradiated onto a photo-sensitive member 50. On the other hand, the second light 342 divided at the half mirror 512 is, after being subject to a direction change at mirrors 513 and 514, irradiated, as a reference light 35, onto the photo-sensitive member 50. Light interference occurs at the photo-sensitive member 50 between the reference light 35 and the object light 36, thereby creating interference fringes in the member 50. A hologram screen 8 as used in the system in FIG. 1 is, thus, produced. In the attached drawings, a series of wavy lines illustrates, schematically, diffuse light.

In the display system in FIG. 1, the size of a visual area is defined as the area of a screen, where a viewer 85 can view an image 81 on the hologram screen 8 from different locations, i.e., a movable area R for the viewer while seeing the diffracted light 32. In FIG. 2, in order to obtain an increased visual area, it is necessary to increase an expansion angle of the object light 36 as introduced into the photo-sensitive member 50 by, for example, increasing the size of the light diffusion body 52 or locating the light diffusion body 52 adjacent to the photo-sensitive member 50. Namely, an increase in the visible area of the screen is obtained by increasing an angle α of an outer edge line 361 of the object light 36 introduced into the photo-sensitive member 50 with respect to the normal line n at the vertical ends of the photosensitive member 50, as shown in FIG. 2. Due to the increase in the expansion angle α of the object light during the exposure process, an increase in a visible area for allowing a viewer to see the diffuse light on the screen 91 when a signal light from a projector is irradiated during a reproduction process.

Figure 3:
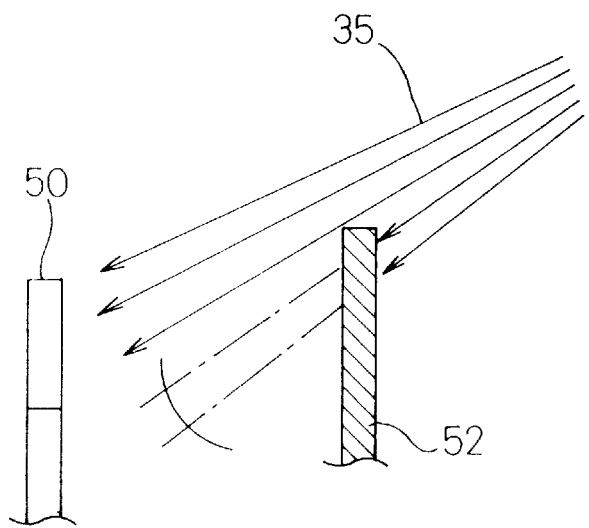
FIG. 3 is partial view of FIG. 2 and illustrates a blockage of-a reference light by a light diffusing body.

However, production of a transparent type hologram screen of an increased visual range is difficult, i.e., increasing the value of the angle α is difficult. Namely, in the process for the exposure of the transparent type hologram screen, the reference light 35 and the object light 36 are introduced into the photo-sensitive member 50 in the identical direction, as shown in FIG. 2. In order to increase the value of the angle α, it is conceivable that the light diffusion body is located adjacent to the photo-sensitive member 50 or that the width W of the light diffusion body 52 is increased. However, such a solution is defective in that, as shown in FIG. 3, the reference light 35 is partly blocked by the light diffusion body 52, which prevents the photo sensitive member 50 to be prevented from being illuminated at its lower part by the reference light. Even in a situation where the light may be transmitted through the light diffusion body, the transmitted light is diffused and stops functioning as a reference light.

Figure 4:
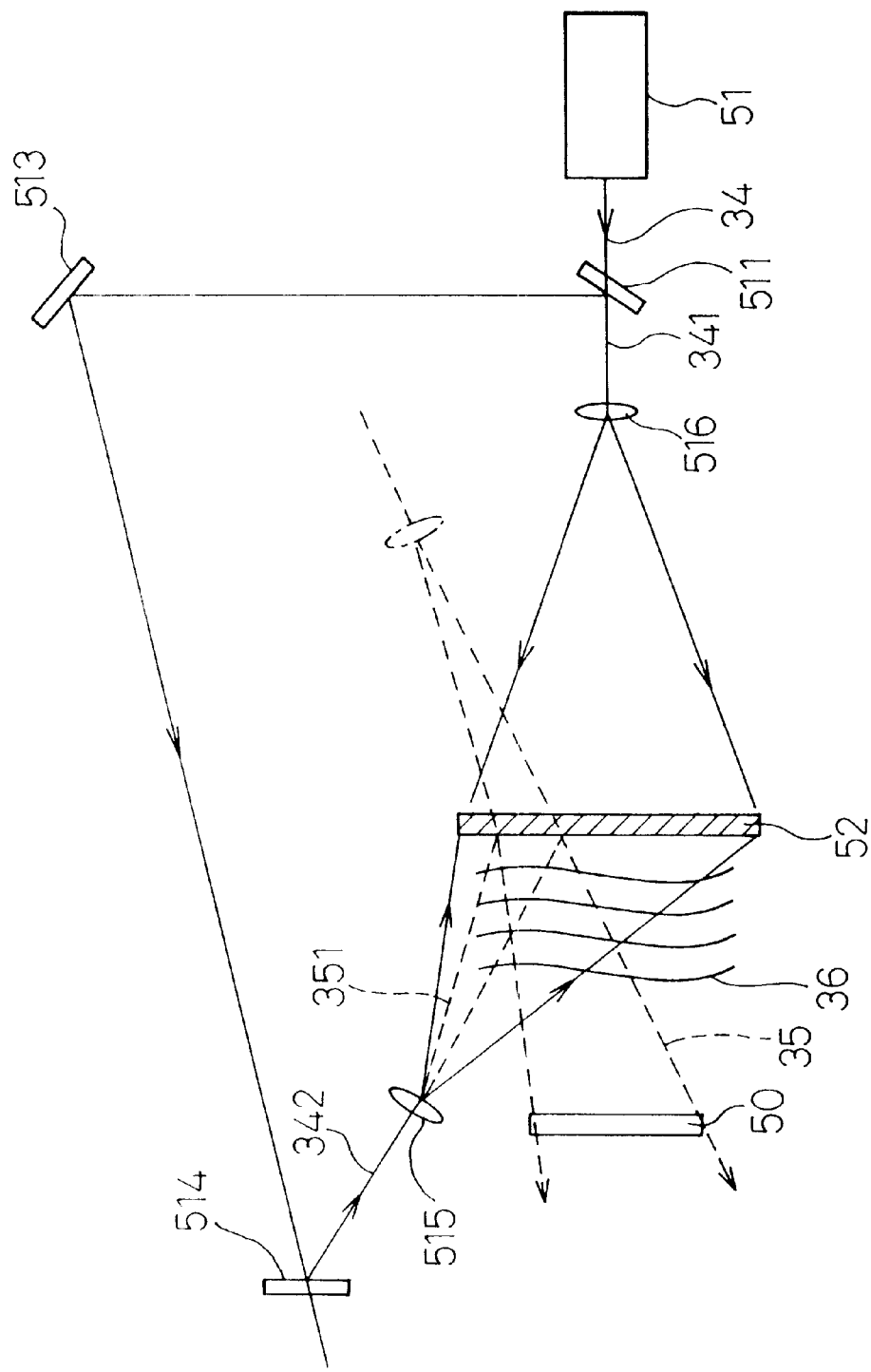
FIG. 4 is a schematic view illustrating a method for producing a transparent type hologram screen according to a first embodiment of the present invention.

Now, a method for producing a hologram screen for overcoming the above mentioned difficulty according to a first embodiment of the present invention will be explained. In FIG. 4, a light sensitive member 50 is, on one side, illuminated by a diffuse light and a non-diffuse light to create a hologram. A light diffusing body 52 is arranged between the photosensitive member 50 and a light source for a reference light 35. As a result, the light from the source is passed through the light diffusing body 52 so that a diffuse light is generated, which is illustrated by a wave as shown in FIG. 1, and forms an object light (signal wave). On the other hand, light emitted from a lens 515 is reflected at the light diffusion body 52 so that reference light (a reference wave) 35 is formed. As a result, interference occurs between the object light 36 and the reference light 35, which causes interference fringes to be generated in the light sensitive member 50.

In this embodiment, the photo-sensitive element 50 includes, as a photo-sensitive agent, a photo-polymer. In place of a photo-sensitive element including the photo-polymer, a photo-sensitive agent including an ammonium dichromate gelatin or a silver chloride can be used.

Furthermore, in the above embodiment, it is described that the light diffusing element 52 is constructed by a double-sided frosted glass of grade #1000. However, as an alternative, the diffusing element 52 may be constructed by another kind of frosted glass, lenticular glass or opal glass.

As already explained with reference to FIG. 1, in order to increase the visible area on the hologram screen, i.e., a movable area R or angle α, wherein the viewer can see the image 81, it is essential that the range of the diffuse light (diffracted light 32) diffracted from the hologram screen 8 is widened. In order to obtain the widened range of the diffracted light 32, it is essential that an expansion angle θ of the object light 36 is increased during the exposure of the photo sensitive member 50. In order to do this, in the first embodiment shown in FIG. 4, the diverted light 351 from the lens 515 is the light source of the reference light 35. A part of the light 351 is regularly reflected without being scattered at the light diffusion body 52 so that the regular reflected light forms the reference light 35. Thus, the light diverted from the lens 516 and diffused by passing through the light diffusion body 52 as well as the light emitted from the lens 515 and reflected and scattered by the light diffusion body 52 form the object light 36.

As explained above, the lens 516 functioning as a light source of the object light 36 and the lens 515 functioning as a light source of the reference light 35 are arranged on opposite sides of the light diffusion body 52. Due to this arrangement, even if the expansion angle α of the object light 36 introduced into the photo-sensitive member 50 is increased, the photo-sensitive member 50 can still be illuminated by the reference light 35 over its entire surface. As a result, a hologram screen 8 of an increased visible area can be easily produced.

Furthermore, according to this embodiment, the object light 36 is, in part, formed by the light which is generated when the light 351 is reflected and scattered at the light diffusion body 52. As a result, an increased strength of the diffracted light 32 is obtained during the reproducing process, thereby increasing the brightness of the image 81 as generated on the screen.

Figure 5:
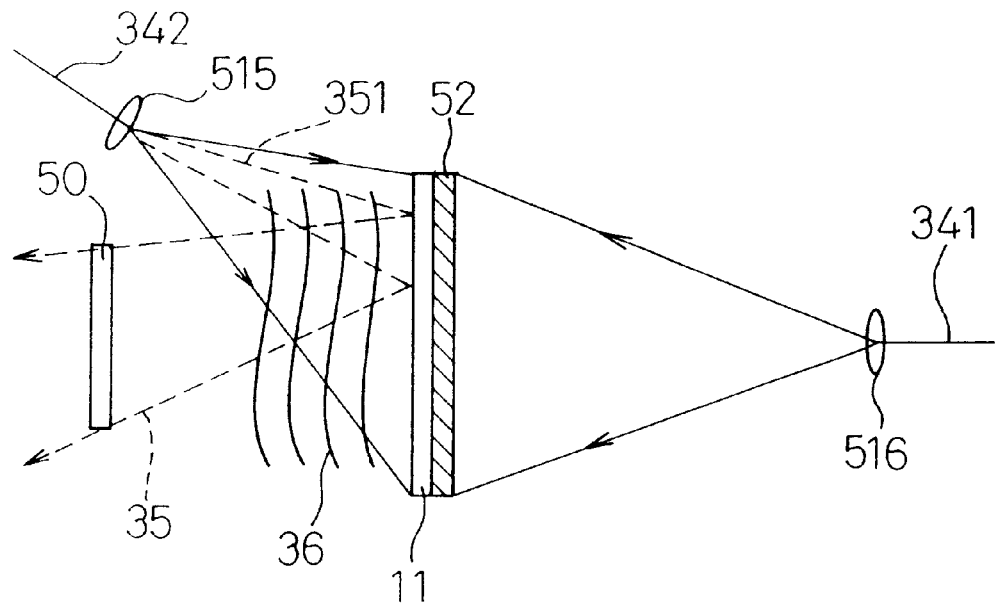
FIG. 5 is a partial schematic view illustrating a method for producing a transparent type hologram screen according to a second embodiment of the present invention.

In FIG. 5, a second embodiment of the present invention is shown, which is different from the first embodiment in FIG. 4 in that a semi-transparent mirror 11 is provided on the light diffusion body 52. Namely, in the second embodiment, on one side of the light diffusion body 52, a photo-sensitive member 50 and the lens 515 which is the light source of the reference light 35 are arranged. Furthermore, the semi-transparent mirror 11 is arranged on the surface of the light diffusion body 52 facing the photo-sensitive member 50.

In the operation of the second embodiment in FIG. 5, the object light 36 is constructed by the diffuse light passed through the light diffusing body 52 and the half mirror 11, while the reference light 35 is constructed by the light 351 emitted from its source and subjected to a regular reflection at the half mirror 11. As a result, as in the first embodiment, the light source (lens 516) of the object light 36 and the light source (lens 515) of the reference light 35 are arranged on the opposite sides of the light diffusion body 52. As a result, irrespective of an arrangement for increasing the expansion angle α(FIG. 2) of the object light 36 introduced into the photo-sensitive member 50, the photo-sensitive member 50 is, over its entire surface, easily illuminated by the reference light 35. Thus, a hologram screen of an increased visible area is obtained.

Furthermore, in this embodiment, the arrangement of the half mirror 11 on the surface of the light diffusion body 35 causes the reflected amount of the light to be increased over that in the first embodiment, thereby increasing the strength of the reference light 35.

Furthermore, the second embodiment is advantageous in that by a suitably adjusting the reflection factor, in the light introduced into the photo-sensitive member 50, the strength or intensity ratio between the reference light 35 and the object light 36 R/O is controlled. In other words, an adjustment of a balance between the reference and object lights is possible which is advantageous in producing a hologram screen of an increased degree of a transparency.

Other elements of the second embodiment in FIG. 5 are similar to those of the first embodiment in FIG. 4. Finally, the half mirror 11 does not necessarily contact the surface of the light diffusion body 52. Namely, a modification is possible that the half mirror 11 is spaced from the surface of the light diffusion body 52.

Figure 6:
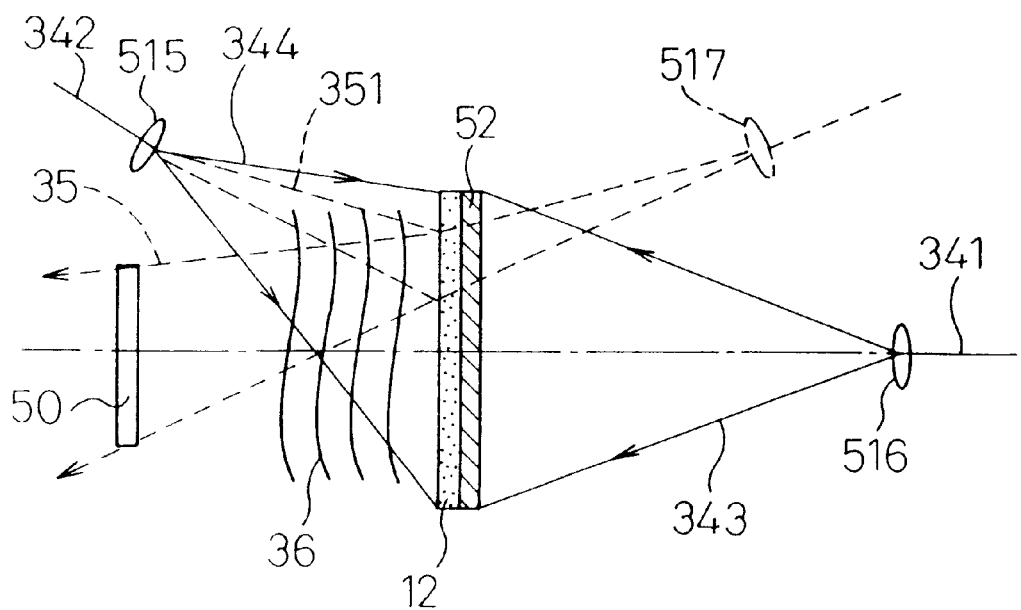
FIG. 6 is a partial schematic view illustrating a method for producing a transparent type hologram screen according to a third embodiment of the present invention.

FIG. 6 shows a third embodiment of the present invention, in which, in place of the half mirror 11 in the second embodiment in FIG. 5, a Lippmann type hologram 12 is used. In a manner well known by those skilled in this art, the Lippmann type hologram 12 diffracts the incident light 351 along the same light path of a divergent light as would be obtained when, in the position opposite the lens 515, i.e., symmetric with respect to the hologram 12, a lens 517 of the same characteristic is located. In this structure of the embodiment, by controlling the efficiency of the diffraction at the hologram 12, the same effect is obtained as if the reflection factor of the half mirror 11 in the second embodiment is changed. In short, this embodiment can obtain a similar effect as in the second embodiment.

Furthermore, by adjusting the interference fringe recorded in the hologram 12, the reflection angle is varied, which allows the divergence position (lens 515) of the reference light 35 to vary substantially with respect to the light diffusing body 52.

Figure 7A:
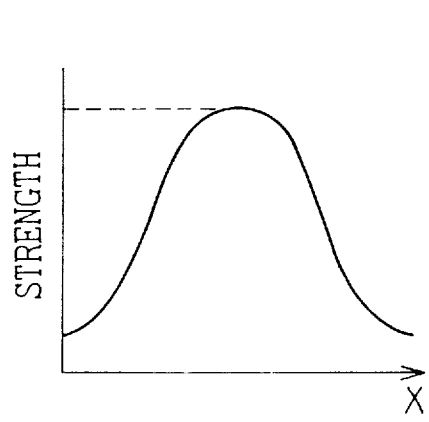
FIGS. 7A and 7B illustrate, respectively, distribution of strength and divergence of a reference light or an object light.
Figure 7B:
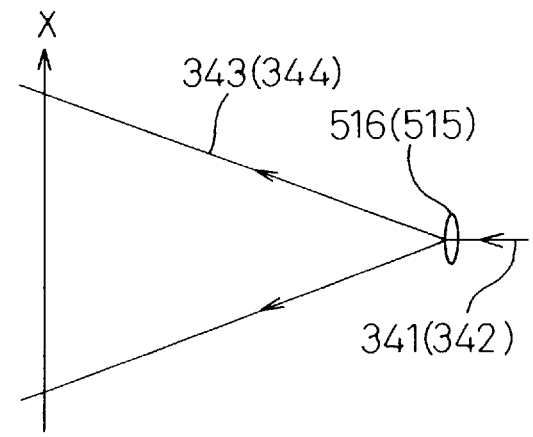

Furthermore, as shown in FIGS. 7A and 7B, the distribution of the strength of the laser light about the central axis is expressed by a Gauss distribution. Thus, the divergent light 344, based on which the reference light 35 is generated as well as the divergent light 343, based on which the object light is generated are distributed along the Gauss distribution.

Thus, the light issued from the divergent light and passed through the light diffusing body 52, i.e., the diffuse light (a first object light) is also distributed along the Gauss distribution.

Thus, the first object light has a decreased strength at the peripheral portion as compared to the central portion. On the other hand, the Lippmann type hologram element 12 has an increased diffraction efficiency at the central part as compared to the peripheral part. Thus, the distribution of the diffraction efficiency of the reflection light is expressed substantially by a Gauss distribution. Thus, the distribution of the light passed through the Lippmann type hologram element 12 (non diffracting light) is expressed by an "inverse" Gauss distribution. Thus, the diffused light passed through the hologram element 12 and scattered at the light diffusion body 52 (second object light) is distributed along an inverse Gauss distribution. Thus, the strength of the total object light, which is the first object light as combined with the second object light, is distributed uniformly as compared with the second embodiment where only a Gauss distribution of the object light would be obtained, thereby obtaining a uniform distribution of the strength of the light on the surface of the image on the screen.

The other elements are similar to those in the first and the second embodiments.

Figure 8:
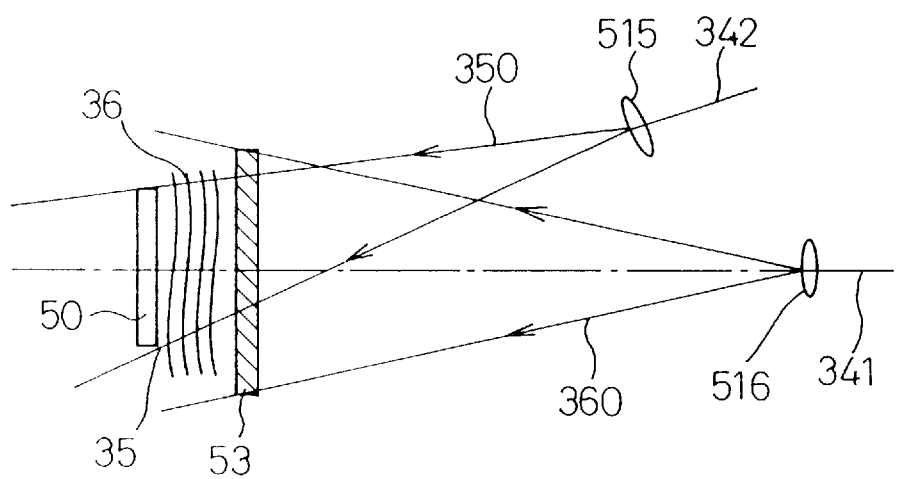
FIG. 8 is a partial schematic view illustrating a method for producing a transparent type hologram screen according to a fourth embodiment of the present invention.

FIG. 8 shows a fourth embodiment which features a transparent light diffusing body 53, and the light source of the reference light as well as the light source of the object light are arranged on one side of the light diffusing body 53. Namely, the transparent light diffusion body 53 is arranged between the lens 515 and 516 and the photo-sensitive member 50. Exposure of the photo-sensitive member 50 is done by the diffuse light passed through the light diffusing body 53 as the object light 35 and the non-diffuse light passed through the light diffusing body 53 as the reference light 35.

In this fourth embodiment in FIG. 8, the light sources of both the object light 36 and the reference light 35 are located on the same side of the light diffusing body 53. Thus, as will be easily seen from FIG. 8, the entire surface of photo-sensitive member 50 is illuminated by the reference light 35 even if the light diffusing body 53 were located adjacent to the photo-sensitive member 50 in order to increase the expansion angle α of the object light introduced into the photosensitive member 50 (FIG. 2). Thus, a hologram screen of an increased visible area can be produced.

Furthermore, because the light diffusion body 53 is located adjacent to the photo-sensitive member 50, a reduction in the size of the light diffusion body 53 is possible. As a result, the amount of illuminated light which does not generate an interference fringe is reduced, thereby enhancing the efficiency of the use of the light and reducing exposure time.

In the embodiment, the light diffusion body includes a hologram element on which the light diffusion body is recorded.

Figure 9:
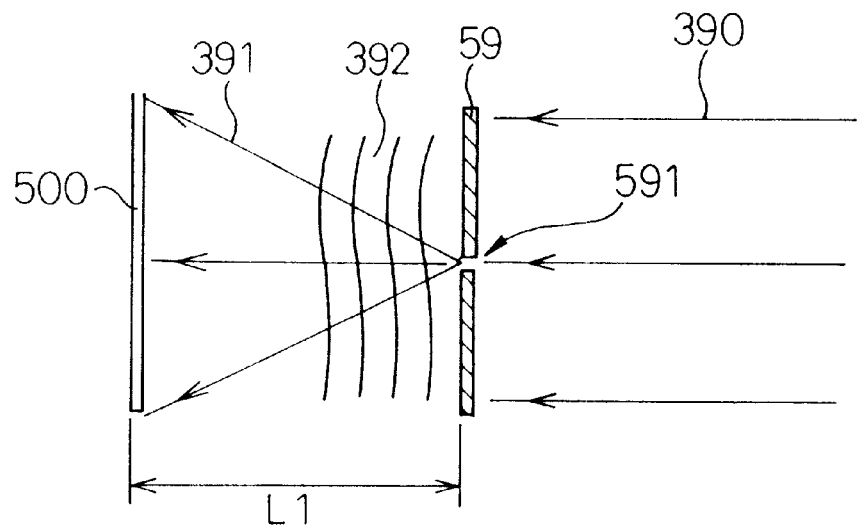
FIG. 9 illustrates a method for an exposure of a hologram used in FIG. 8.

In FIG. 9, for the sake of a simplicity of an explanation, the photo sensitive member 50 and the light diffusing body 53 are shown spaced apart from each other. However, it is desirable that the members 50 and 53 are in close contact.

Now, a method for obtaining a hologram diffusion body 53 in this embodiment will be explained. As shown in FIG. 9, a photo-sensitive member 500 and a light diffusion body 59 are arranged at a desired distance L1. The light diffusion body 59 is formed with a pin hole 591 at its central position.

In this embodiment, a photo polymer is used as the light sensitive agent for the light sensitive member 500. However, in place of the photo polymer, any other type of light sensitive agent such as ammonium dichromate gelatin or a silver chloride can be used. As for the photosensitive member, it is desirable to use one that can provide an increased transparency of the completed hologram.

In FIG. 9, the distance L1 between the photo-sensitive member 500 and the light diffusion body is equal to the distance between the divergence point (lens 516) of the object light 392 and the light diffusing body 53.

In the arrangement in FIG. 9, the non-diffuse light passed through the pin hole 591 is diffracted so that the light is diffused, thereby providing a reference light 391. On the other hand, light passed through the body of the light diffusion body 59 and diffused thereat constructs a object light 392.

By exposing the light in the optical system in FIG. 9, a hologram as a transparent light diffusing body is obtained from the photo sensitive element 500.

This embodiment features a transparent light diffusion body 53 having directivity which is used in the fourth embodiment. The directivity is such that only a light as obtained when the incident light is at a predetermined incident angle is diffused. The light 360 is introduced in an angular range including the above mentioned desired angular range to the light diffusion body 53. A diffuse light passed through the light diffusion body 53 becomes an object light 36. Furthermore, a light 350 is introduced into the light diffusion body 53 at an angle other than the predetermined diffusing angle, so that a non-diffuse light as a reference light 35 is obtained. The exposure of the photo-sensitive element 50 is done. The other elements are the same as those in the fourth embodiment.

In this embodiment, a hologram screen of an increased visible area is obtained as in the fourth embodiment.

Finally, in the this fifth embodiment, by using the light diffusing body 53 having directivity, the strength of the reference light 35 and the object light 36 can be varied by changing the angle of the directivity and/or the incident angle of the light 350 or 360.

Figure 10:
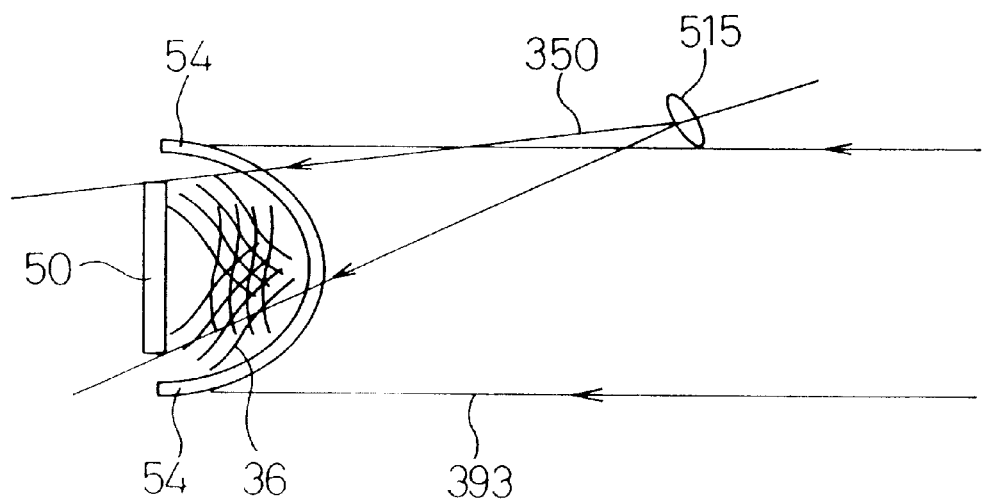
FIG. 10 is a partial schematic view illustrating a method for producing a transparent type hologram screen according to a sixth embodiment of the present invention.

FIG. 10 shows a sixth embodiment, where in place of the light diffusion body 53 in the fourth embodiment in FIG. 8, a Fresnel lens type hologram element 54 is employed. In order to produce such a Fresnel lens type hologram element 54, in a similar way as shown in FIG. 9, first, a photosensitive member 500 is illuminated, in the same direction, by a divergent light as a reference light 391 and a diffuse light as an object light 392, thereby obtaining a hologram. Then, the hologram is formed so that a convex shape projected toward the light source (515) is obtained. In this case, the distance between the photo sensitive member 500 and the light diffusion body 54 is equal to the desired focal length L2 of the curved hologram member 54 as shown in FIG. 11.

Figure 11:
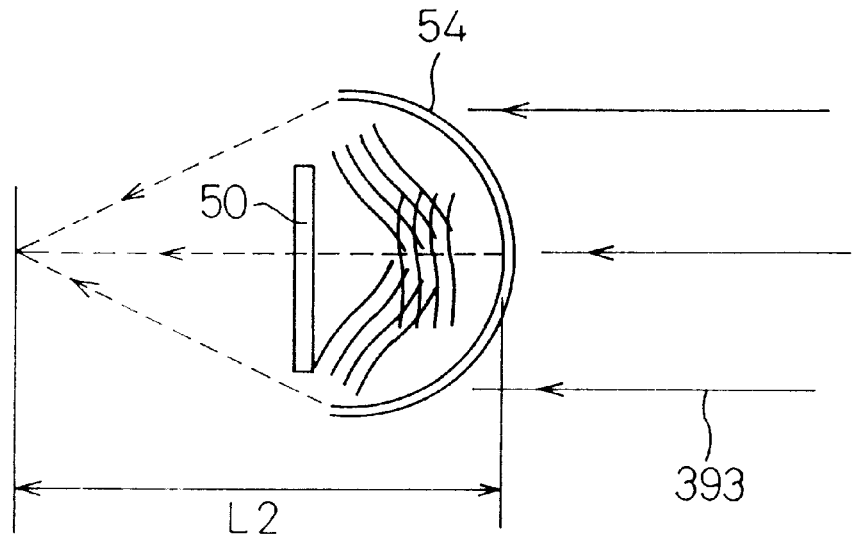
FIG. 11 illustrates a method for an exposure of a hologram used in FIG. 10.

In the operation of the sixth embodiment, as shown in FIG. 11, the light diffusing body 54 is illuminated by the light 393, which is similar to the light 390 in FIG. 9, so that a diffuse light (object light 36) directed, at its axis, toward the focal point F as a diffracted light of the light diffusing body 54, is generated.

Under an arrangement that a photo sensitive member 50 is arranged on the side of the center of the curvature of the curved body (hologram element 54), exposure is done by the diffuse light passed through the hologram element 54 as the object light 36 and a non-diffuse light passed through the hologram element 54, as the reference light 35.

According to this embodiment, the Fresnel type hologram 54 can generate a diffuse light at an increased efficiency when the light is incident at a predetermined angle. A part of the light introduced at the above mentioned predetermined angle and most of the light introduced at an angle less than the predetermined angle are, generally, not diffracted, but are passed through the element 54 to generate a non-diffuse light.

In this embodiment, an interference fringe is obtained by the diffuse light as an object light36 and a non-diffuse light as a reference light 35. The diffuse light from the hologram element 54 is more likely directed to the center of the curvature, thereby obtaining an angle α greater than that obtained by a flat shape hologram element. Thus, by this embodiment, a hologram of an increased visible area can be obtained.

Figure 12:
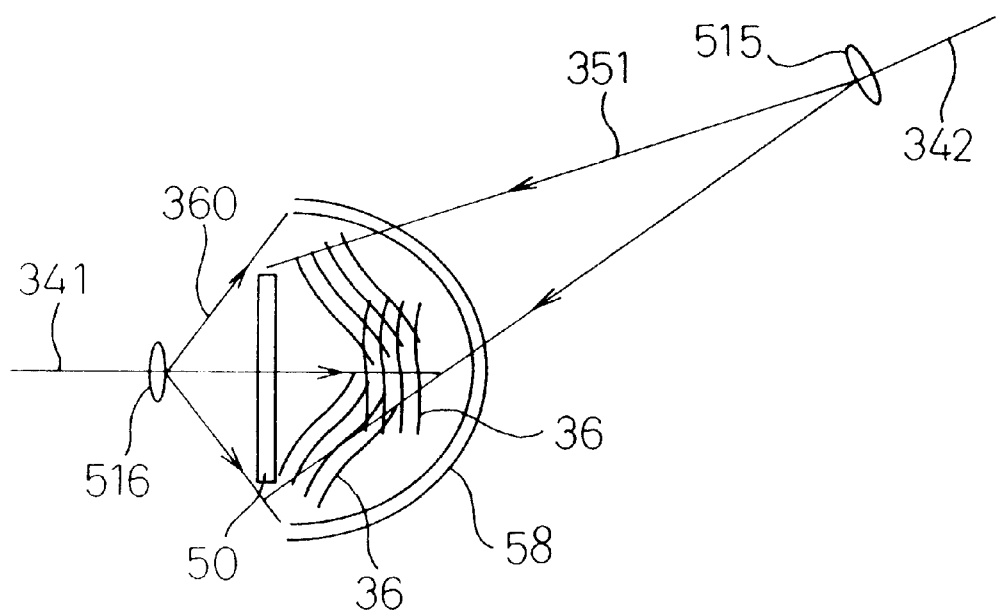
FIG. 12 is a partial schematic view illustrating a method for producing a transparent type hologram screen according to a seventh embodiment of the present invention.

FIG. 12 shows a seventh embodiment, where in place of the Fresnel type hologram element 54 in the sixth embodiment in FIG. 10, a Lippmann type hologram element 58 is used, and the light source (lens 516 of the object light 36) and the light source (lens 515) for the reference light 35 are arranged on opposite sides of the photo-sensitive body 50.

In this embodiment, the light 360 diverted from the lens 516 is diffracted and reflected at the Lippmann type hologram element 58 to obtain a diffuse light as the object light, while the light 351 from the lens 515 is passed through the hologram element 58 to obtain a non-diffuse light as the reference light 35. As a result, a similar effect as that in the sixth embodiment is obtained. Namely, the Lippmann type hologram can provide an object light 36 and a reference light 35 to the photo-sensitive member 50 like the Fresnel type hologram.

Figure 13:
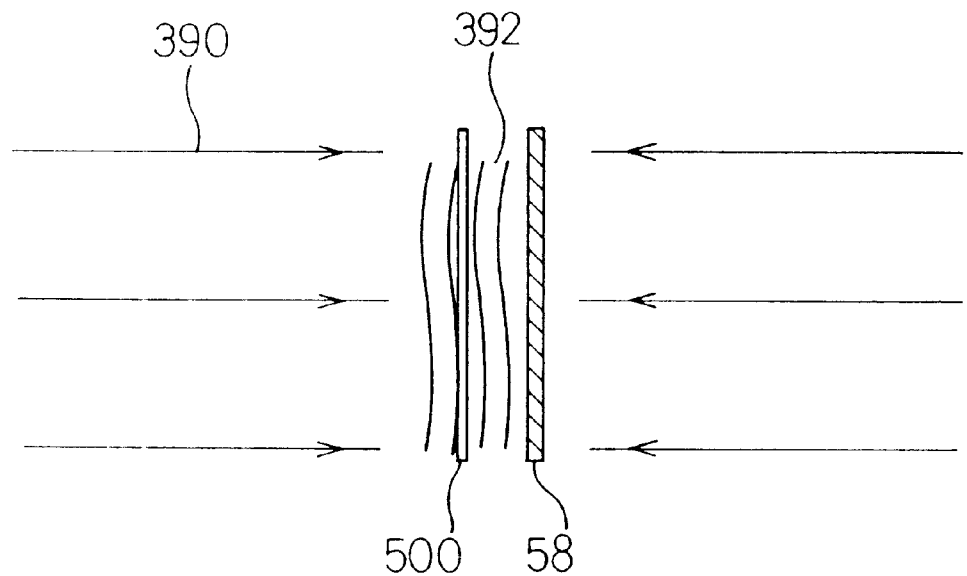
FIG. 13 illustrates a method for an exposure of a hologram used in FIG. 12.

In order to produce the Lippmann type hologram element 58, as shown in FIG. 13, the diffuse light passed through the light diffusing body 58 as an object light 392 illuminates the photo sensitive member 500 on one side, while a parallel light such as reference light 390 illuminates the photosensitive member 500 on the other side, so that a hologram is obtained. Then, the hologram is formed into a curved shape. The other elements are identical to those in the sixth embodiment.

Figure 14:
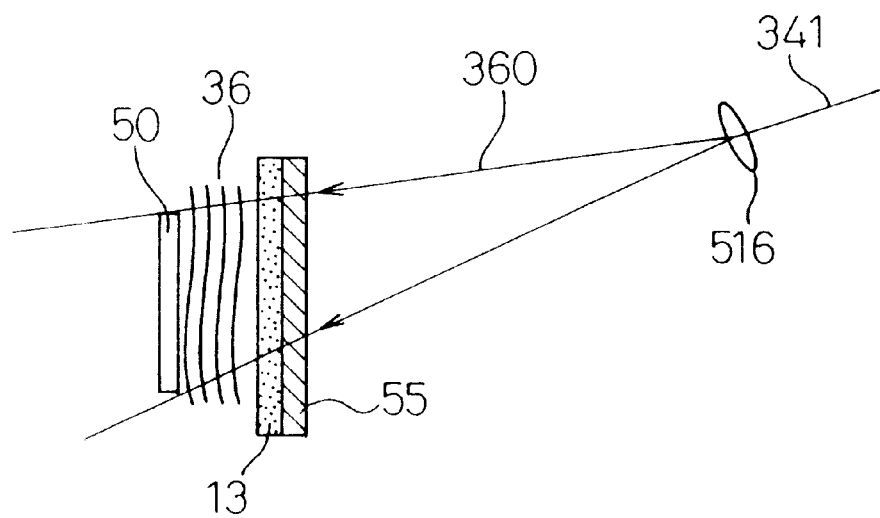
FIG. 14 is a partial schematic view illustrating a method for producing a transparent type hologram screen according to an eighth embodiment of the present invention.

FIG. 14 shows an eighth embodiment, which features first and second transparent hologram elements 55 and 13 which are arranged between a light source (the lens 516) and the photosensitive member 50. The first hologram element 55 is a Lippmann type hologram in which a light diffusion body is recorded. The second hologram element is a Lippmann type hologram in which a flat mirror is recorded. The first hologram element 55 is arranged on one side of the photosensitive member 50 while its incident surface for the light for the hologram regeneration faces the photosensitive member. The second hologram element 13 is arranged on the same side of the photosensitive member 50, between the first hologram element 55 and the photosensitive member, while its incident surface for hologram regeneration faces the light source. Thus, the illuminating light 360 is, in part, passed straight through the first and second hologram elements as a straight light (non-diffuse light) as the reference light. The illuminating light 360 is, in part, passed through the first hologram element 55, is diffracted and reflected by the second hologram element 13, and is diffracted and reflected at the first hologram element 55 so that an object light 36 is obtained.

In this arrangement, as will be easily understood from FIG. 14, an increase in the size of the hologram element 55 as a diffusion body easily increases the expansion angle α or the hologram element 55 as the light diffusion body can be located closer to the photosensitive member 50 to increase the expansion angle α of the object light 36. Thus, a hologram screen of an increased visible area can easily be produced.

Furthermore, an adjustment of the diffraction efficiency of the hologram elements 55 and 13 can allow the strength ratio between the reference light and the object light to be easily adjusted.

Furthermore, the embodiment makes impossible that the photosensitive member is illuminated by a single beam, thereby simplifying the structure of the system for exposure and improving the efficiency of utilization of the laser light.

The remaining elements are similar to those of the first embodiment.

Figure 15:
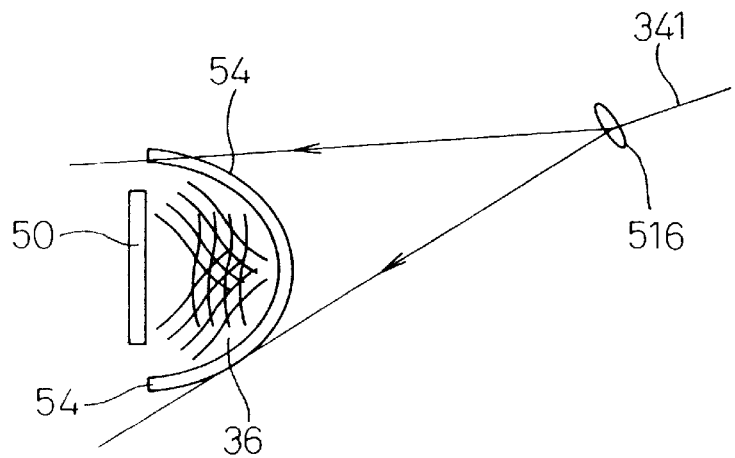
FIG. 15 is a partial schematic view illustrating a method for producing a transparent type hologram screen according to a ninth embodiment of the present invention.

FIG. 15 shows a ninth embodiment, which features use of a single light beam as a light source as in the sixth embodiment in FIG. 10. Namely, in FIG. 15, the photosensitive member 50 is illuminated by the diffuse light passed through and diffracted at the Fresnel type hologram element 54 as the object light 35 and by the non-diffuse light passed through the hologram element 54 without being diffracted as the reference light, thereby forming an interference fringe on the photosensitive member 50.

Figure 16:
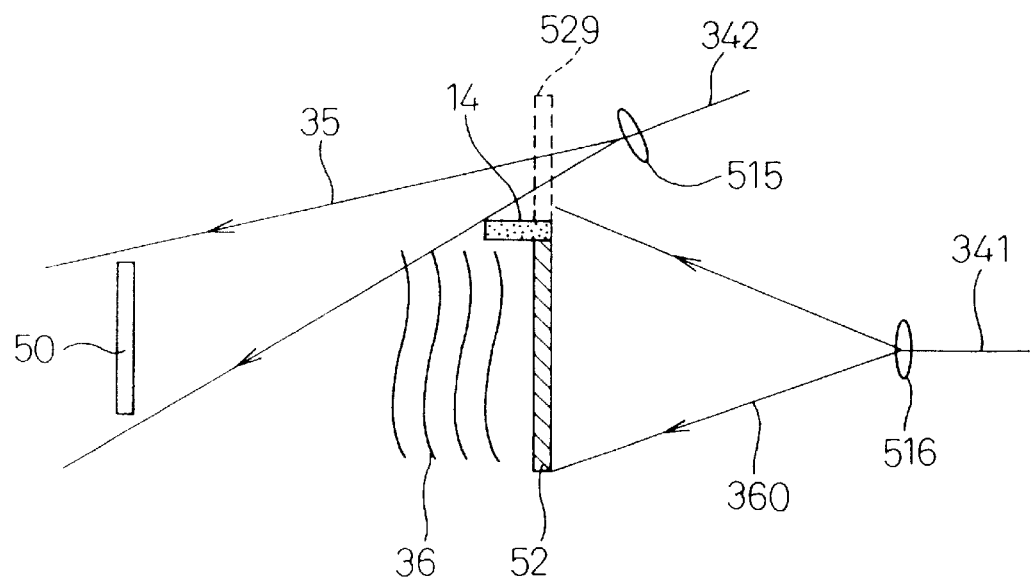
FIG. 16 is a partial schematic view illustrating a method for producing a transparent type hologram screen according to a tenth embodiment of the present invention.

FIG. 16 shows a tenth embodiment, which features a reflective optical element 14 projected toward the photosensitive member 50, located at an end of the light diffusion body 52 where the reference light 35 is directed toward the photosensitive member 50. The reflective optical element 14 diffracts and reflects the light introduced at an angle opposite to the angle that the reference light 35 forms with respect to the normal line to the incident plane of the photosensitive member 50. As a result, a part of the diffuse light passed through the light diffusion body 52 is reflected at the reflective optical element 14 and is introduced, as the object light, into the photosensitive member 50.

In this embodiment, the reflective optical element 14 is projected toward the photosensitive member 50, from the front end of the light diffusion body 52 to obtain a function where the diffuse light as passed through the light diffusion body 52 is reflected toward the photosensitive member 50. This function for generating the object light 35 is identical to the one obtained by extending the end of the light diffusion body 52 as shown by a dotted line 529 in FIG. 16. The provision of the reflective optical element 14 is advantageous in that the reference light 35 is not blocked as is the case when the extended part 529 of the light diffusion body 52 is provided. Thus, the embodiment in FIG. 16 is advantageous in that an increased angle of expansion of the object light is obtained while preventing the reference light 35 from being blocked. As a result, a hologram screen of an increased visible area can be produced.

The remaining elements are similar to those in the first embodiment in FIG. 1.

Figure 17:
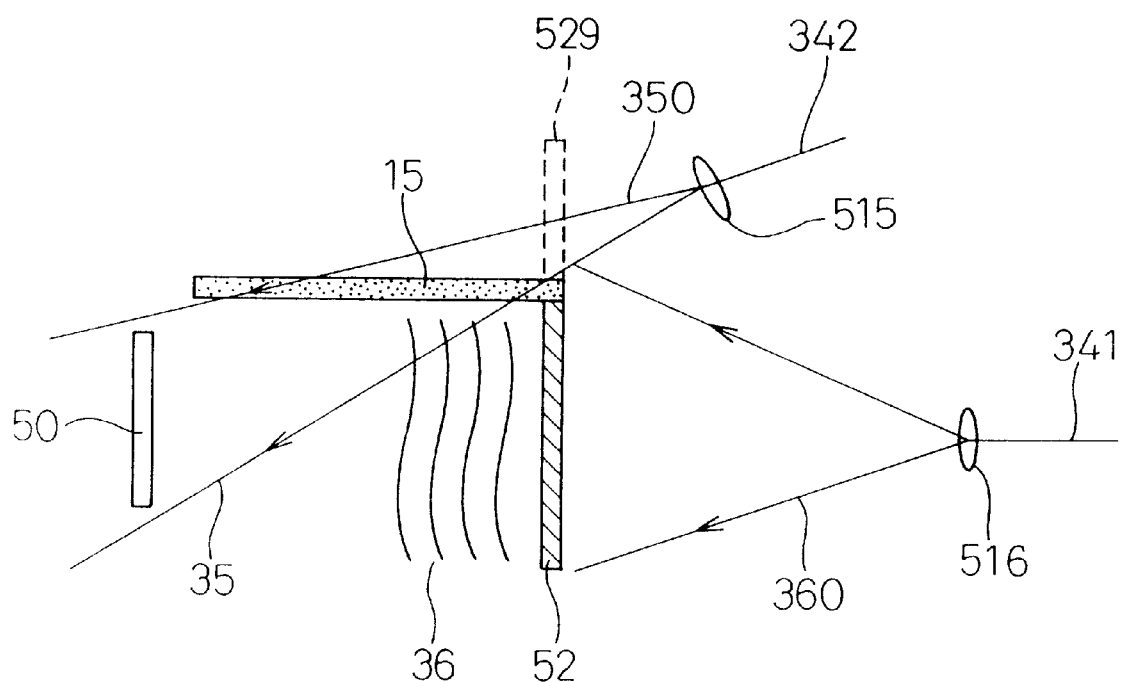
FIG. 17 is a partial schematic view illustrating a method for producing a transparent type hologram screen according to a eleventh embodiment of the present invention.

FIG. 17 shows an eleventh embodiment, which features a reflective optical element 15 which is a Lippmann type hologram element which allows a part of the light to pass therethrough while being diverged. In this arrangement, part of the light 360 diverted by the lens 516 passes through and is diffracted at the light diffusing body 52, thereby forming a diffuse light. Part of the light 360 is partly reflected at the diverting optical element 15 and introduced, as a object light, into the photosensitive member 50. The light diverged at the lens 515 passes through the reflective optical element 15 and is introduced, as a reference light, into the photosensitive member 50.

In the arrangement of this embodiment, the reflective optical element 15 allows the light 350 to pass therethrough. Thus, the flexibility of arrangement of the light source of the light 350 (lens 515) is increased compared to the tenth embodiment in FIG. 16. Furthermore, by arranging the reflective optical element 15 at a location adjacent the photosensitive member 50, the object light 36 is introduced into the photosensitive member 50 at wider angle. Thus, a further increase in the expansion angle α of the object light is obtained, thereby allowing a hologram screen of with wide visible area to be easily produced.

The other elements are the same as those in the embodiment in FIG. 11.

Figure 18:
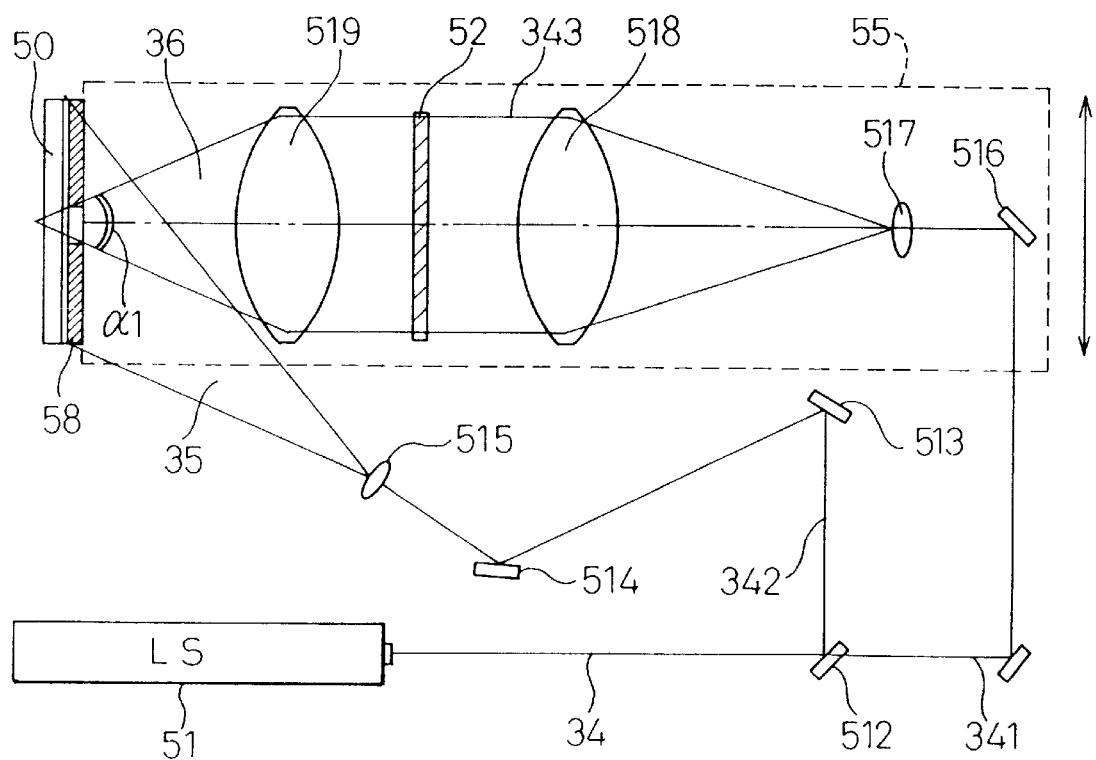
FIG. 18 is a partial schematic view illustrating a method for producing a transparent type hologram screen according to a twelfth embodiment of the present invention.

In a twelfth embodiment shown in FIG. 18, the position of the object light 36 is gradually moved so that a hologram screen of an increased image with a wide visible range is produced. Namely, in this embodiment, the light beam 34 is divided, by the beam splitter 512, into first and second beams 341 and 342. The light beam 342 is, via mirrors 513 and 514, diverged by the lens 515 to obtain a reference light 35. The divergence point of the reference light 35 is identical to the location of the projector 92 in the hologram screen 8 in FIG. 19. The other beam 341 forms an object light on an optical system on a carriage 55 which is movable in the direction of the beam 341 as shown by an arrow. Namely, the beam 341 is, after undergoing a direction change at a mirror 516 on the carriage 55, diverted at the diversion lens 517 and is collimated by a collimating lens 518 to obtain a parallel light 343. The parallel light is passed through the light diffusing body 52, thereby providing a diffuse light, which is condensed by the objective lens 519 to an object light 36.

In this embodiment, as shown in FIG. 18, a mask 58 is arranged on the front surface of the photosensitive member 50 for masking the member 50 other than the location for exposure. In other words, an unnecessary portion of the object light is masked. As a result, a single elemental hologram (screen element) of a reduced area is obtained by the object light 36 and the reference light 35 passed through the mask 58. Then, the carriage 55 together with the parts, such as a mask 58 thereon, is moved forwards or backwards, as shown by the arrow so that elemental holograms are successively produced.

Figure 19:
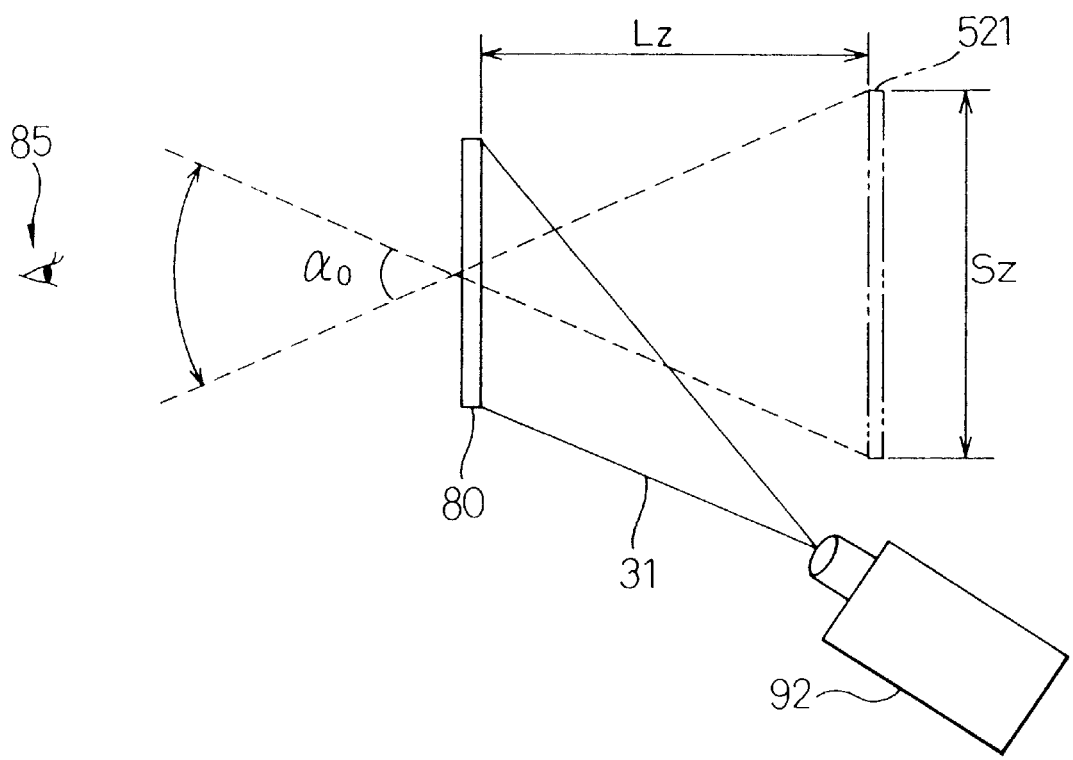
FIG. 19 illustrates a reproduction image by a hologram screen using elemental holograms produced by the method in FIG. 18.

Now, a reproduction operation will be explained with reference to one of the elemental holograms. As shown in FIG. 19, projection of a signal light 31, including an image from a projector 92 located at the divergence point of the reference light 35, causes the elemental hologram to reproduce an image 521 of the light diffusing body. Under an action for changing a wave front by the elemental hologram 80, a reproduction of an image of the light diffusing body is done at an infinite distance $L_z$ with an infinite magnitude $S_z$. Thus, a viewer 85 is able to view a reproduction only at a range of the angle $\alpha_0$ corresponding to the visible area.

Figure 20:
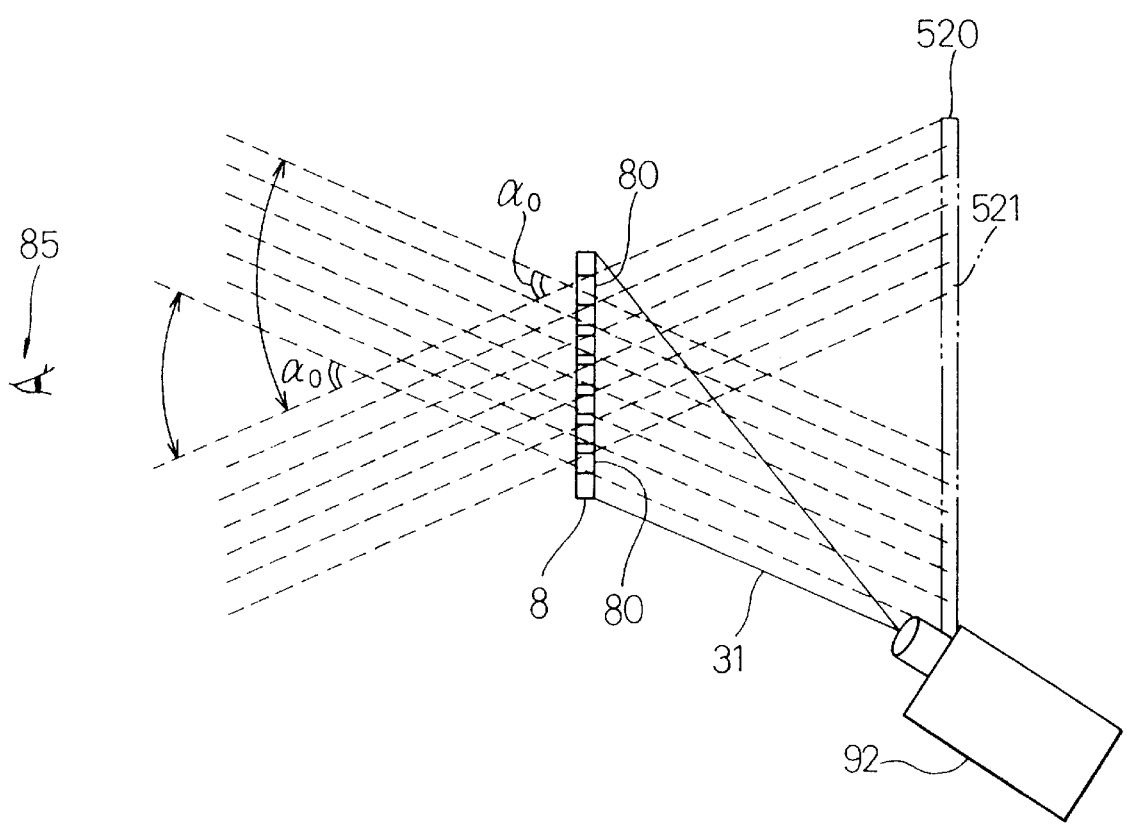
FIG. 20 illustrates a production image of a screen as of the elemental holograms produced by the method

In the hologram screen 8, an assembly of the series of the elemental holograms 80 as shown in FIG. 20 is viewed by the viewer 85. A light diffusion body 520 of an increased size is an assembly of the light diffusion bodies 521. The elemental holograms are viewed at a rear side of the screen by the viewer 85. In this case, a visible area $\alpha_0$ on which the viewer 85 can view the light diffusion body 520 is determined by the diameter and a focal length of the object lens 519 during the exposure process. Namely, the visible area is determined by the range (angle $\alpha_0$) of the converged object light 36 during the exposure process. In other words, an increase in the visible area can be obtained by locating the lens near to the photosensitive member 50 in order to increase the value of the angle $\alpha_0$.

In view of the above, by controlling the ratio between the effective diameter of the lens 519 and the focal length, which is referred as the numerical aperture, control of the visible area $\alpha_0$ becomes possible. In this arrangement of the hologram screen 8, a reproduction of the light diffusing body 520 is done at an infinite point, thereby keeping an increased visible range.

In this embodiment, by moving the object light 36 as well as the mask 58, an increased size of the hologram screen as an assembly of elemental holograms is obtained.

The remaining elements are the same as those in the first embodiment.

Figure 21:
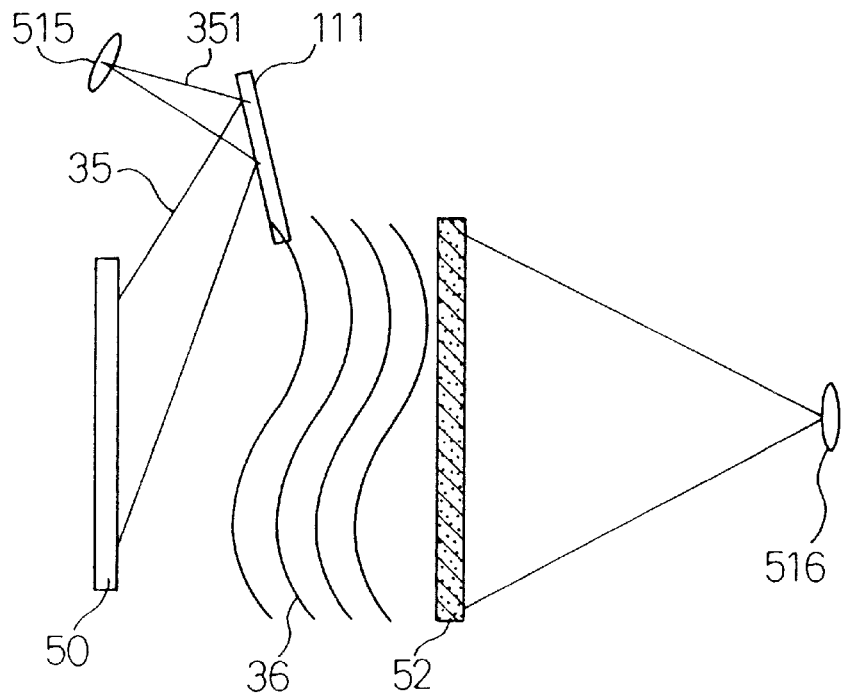
FIG. 21 is a partial schematic view illustrating a producing a transparent type hologram screen to a thirteenth embodiment of the present

A thirteenth embodiment shown in FIG. 21 features a modification of the arrangement of the second embodiment in FIG. 5 in that the half mirror 111 is slightly inclined and spaced apart from the light diffusing body 52.

In this arrangement, an attenuation, which would otherwise occur by a passage of the object light 36 via the half mirror 111, is prevented. Furthermore, due to an adjustment of the position and the inclination angle of the half mirror 111, an increase in the degree of freedom to arrange the light source and the light path in the reference light 35.

The remaining elements are the same as those in the second embodiment.

Figure 22:
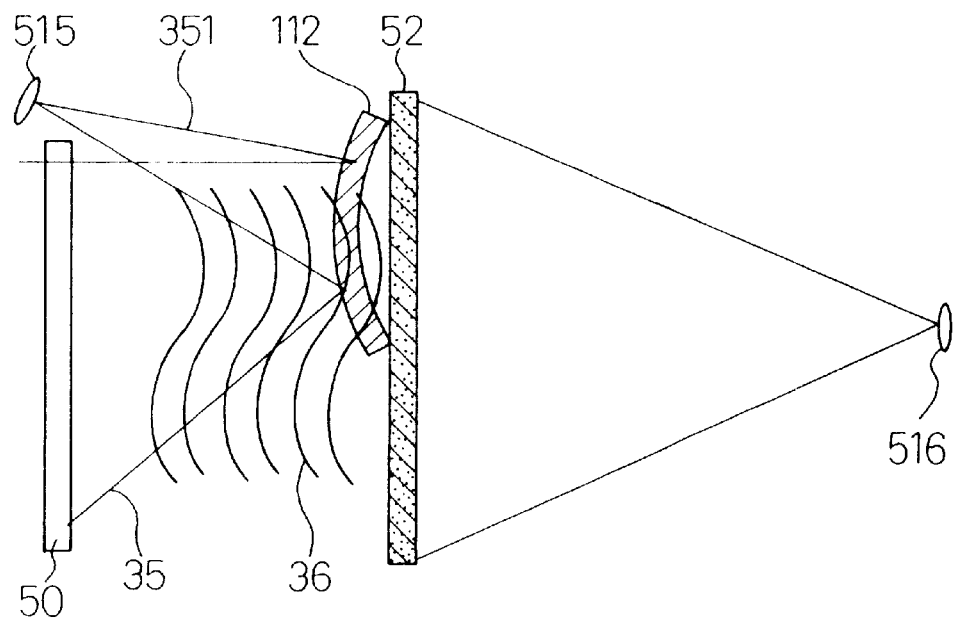
FIG. 22 is a partial schematic view illustrating a method for producing a transparent type hologram screen according to a fourteenth embodiment of the present invention.

A fourteenth embodiment shown in FIG. 22 features a modification of the arrangement of the second embodiment in FIG. 5 in that a convex mirror 112, instead of the half mirror 11, is used.

The use of the convex mirror allows, in order to make the reference light 35 to be introduced into the photosensitive member at the same divergence angle, the lens 515 for the reference light 351 to be located at closer than the flat mirror. Furthermore, due to the desired setting of the degree of the curvature of the convex surface, and the location and the inclination angle of the mirror 112, an increased degree of freedom is obtained as to the incident angle and the expansion angle of the reference light.

The remaining elements are the same as those in the second embodiment.

Figure 23:
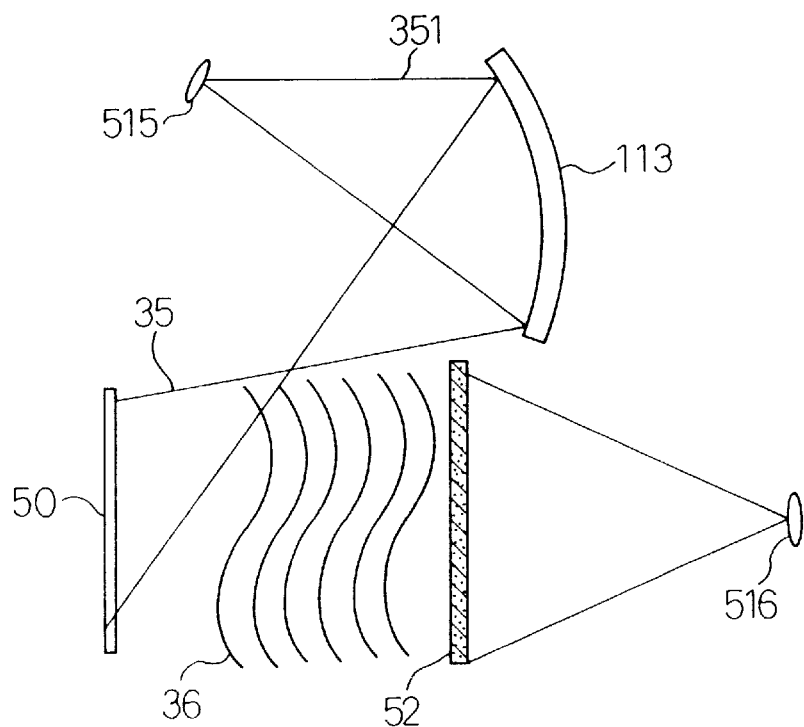
FIG. 23 is a partial schematic view illustrating a method for producing a transparent type hologram screen according to a fifteenth embodiment of the present invention.

A fifteenth embodiment shown in FIG. 23 features a modification of the arrangement of the second embodiment in FIG. 5 in that a concave mirror 113 is employed as a half mirror Because the concave mirror 113 is used, the light introduced into the mirror 113 is converged and then introduced into the photosensitive member 50. As a result, the focal point of the reference light 35 is located at a position closer to the photosensitive member as compared to the fourteenth embodiment in FIG. 22, thereby reducing the incident distance of the reference light 35. Furthermore, similar to the fourteenth embodiment, an increased degree of the freedom is obtained as to the incident angle as well as the expansion angle of the reference light with respect to the photosensitive member.

The remaining elements are the same as those in the second embodiment.

Figure 24:
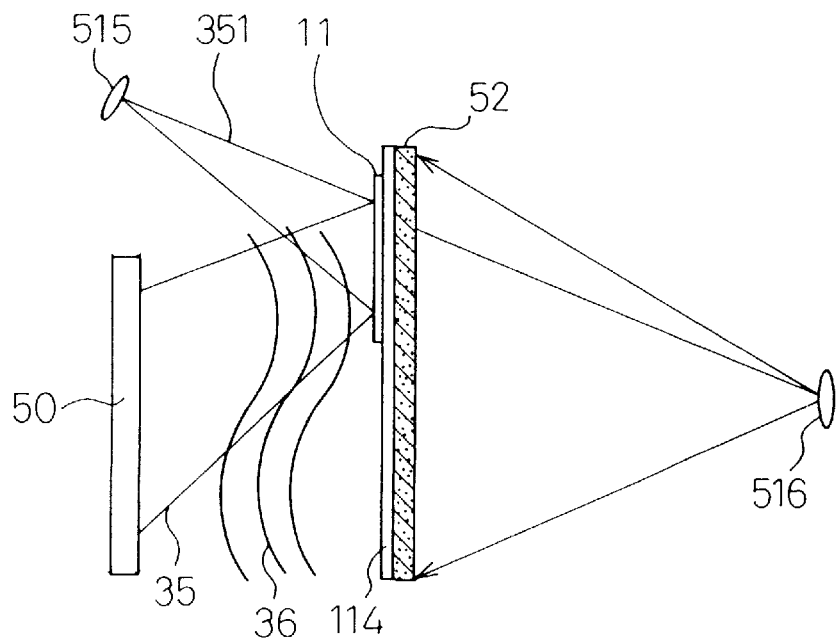
FIG. 24 is a partial schematic view illustrating a method for producing a transparent type hologram screen according to a sixteenth embodiment of the present invention.

A sixteenth embodiment shown in FIG. 24 features a modification of the arrangement of the second embodiment in FIG. 5 in that the half mirror 11 is adhered to a transparent glass member and arranged so that the half mirror 11 covers only a part of the surface of the light diffusing body 52.

In this arrangement, a reduction of an attenuation of the object light 36 is obtained at a portion of the light diffusing body 52 not covered by the half mirror 11, thereby obtaining an increased strength of the object light.

The remaining elements are the same as those in the second embodiment.

Figure 25:
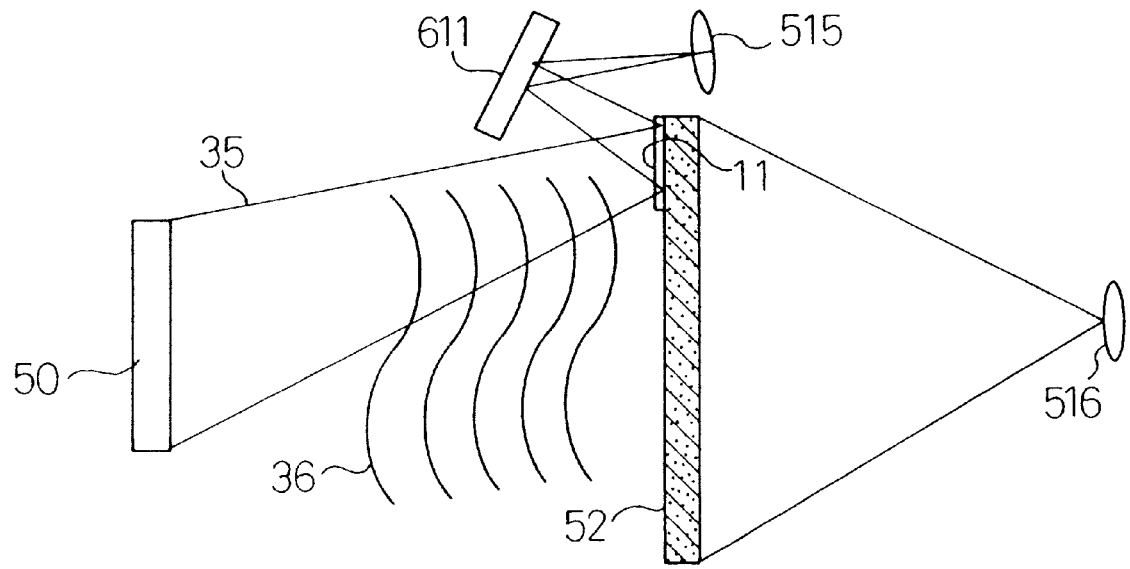
FIG. 25 is a partial schematic view illustrating a method for producing a transparent type hologram screen according to a seventeenth embodiment of the present invention.

A seventeenth embodiment shown in FIG. 25 features a modification of the arrangement of the sixteenth embodiment in FIG. 24 in that a reflective optical element 611 is arranged between the lens 515 and the half mirror 11 and the lens 515 as a light source of the reference light 36 does not face the light diffusing body 52.

By this arrangement, an increase in the degree of freedom of a spatial arrangement of the light path of the reference light 35 is obtained.

As for the reflective optical element, any suitable element can be utilized, including a mirror such as a flat mirror or a concave or convex mirror or a Lippmann hologram. In case where the Lippmann hologram is employed, a characteristic such as a non-regular type of reflection or a color selectively can be obtained.

The remaining elements are the same as those in the second embodiment.

Figure 26:
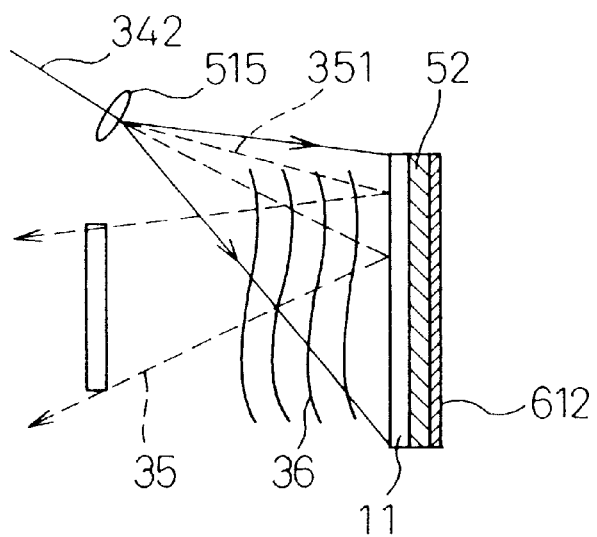
FIG. 26 is a partial schematic view illustrating a method for producing a transparent type hologram screen according to an eighteenth embodiment of the present invention.

An eighteenth embodiment shown in FIG. 26 features a modification of the arrangement of the second embodiment in FIG. 5 in that a mirror coating 612 for reflection of the light is formed at the rear side of the light diffusing body 52, while a hologram screen is produced by a single beam method.

In the operation of this embodiment, a part of the incident light 351 is subject to a regular reflection at the half mirror 11 so that a reference light 35 is obtained, while the remaining part of the light is passed through the light diffusing body 52 and is subjected to a reflection at the mirror coating 612 so that an object light 36 is obtained.

Due to the employment of the single beam method for en exposure, the light emitted from the laser as a light source is transformed into the reference light 35 and the object light 36 without division of light, thereby largely reducing the loss of light and increasing intensity during exposure. As a result, a reduction of an exposure time is obtained, while the quality of the hologram is improved since the single beam method can easily maintain a stable condition of the system during the exposure process.

The remaining elements are the same as those in the second embodiment.

Figure 27:
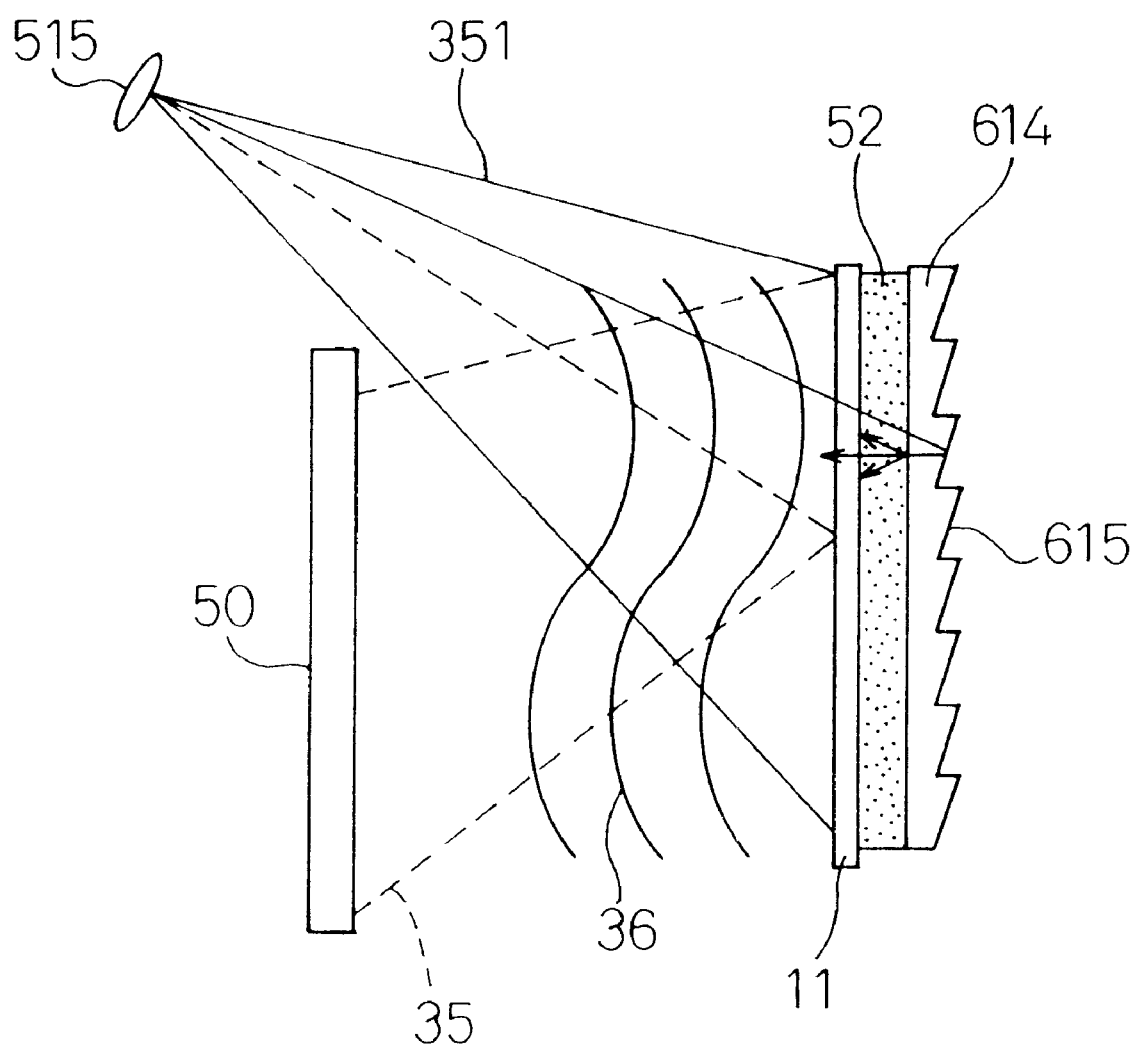
FIG. 27 is a partial schematic view illustrating a method for producing a transparent type hologram screen according to a nineteenth embodiment of the present invention.

A nineteenth embodiment shown in FIG. 27 features a modification of the arrangement of the embodiment in FIG. 19 in that a prism sheet 614 is formed with a serrated boundary surface, on which a mirror coating 615 is formed and the incident light is subjected to a regular reflection in the direction of the photosensitive member 50, while the diffuse light (object light 36) has a center of the intensity in the direction of the photosensitive member 50.

In this arrangement of the embodiment, the intensity of the object light 36 directed to the photosensitive member 50 is increased to be comparable with that obtained when the divergent light is introduced into the rear side of the light diffusing body 52 opposite the photosensitive member 50, as shown in the first embodiment shown in FIG. 4. As a result, the object light 36 directed to the photosensitive member 50 has a more uniform distribution of the light intensity compared to the eighteenth embodiment in FIG. 26.

The remaining elements are the same as those in the eighteenth embodiment.

Figure 28:
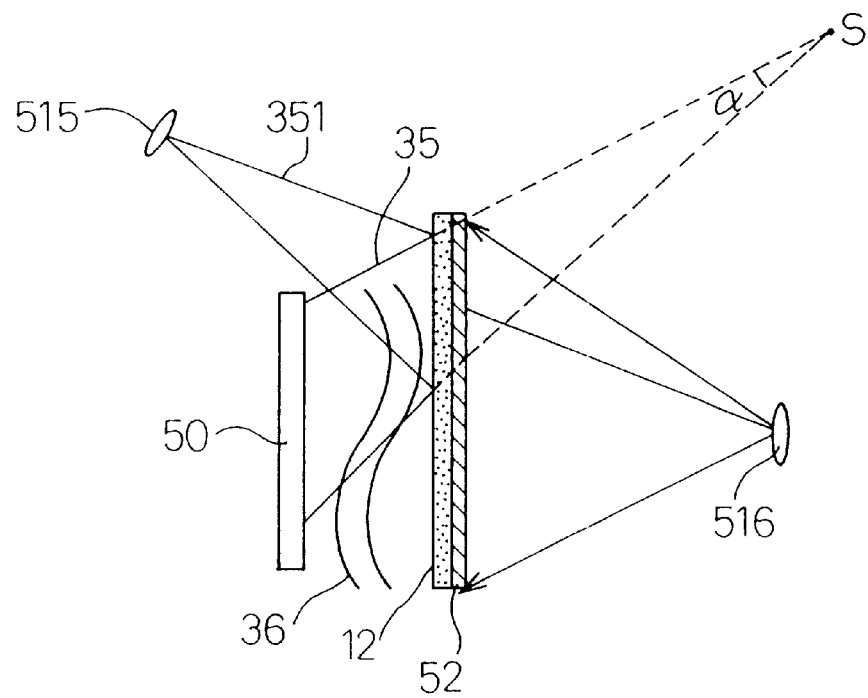
FIG. 28 is a partial schematic view illustrating a method for producing a transparent type hologram screen according to a twentieth embodiment of the present invention.
Figure 29:
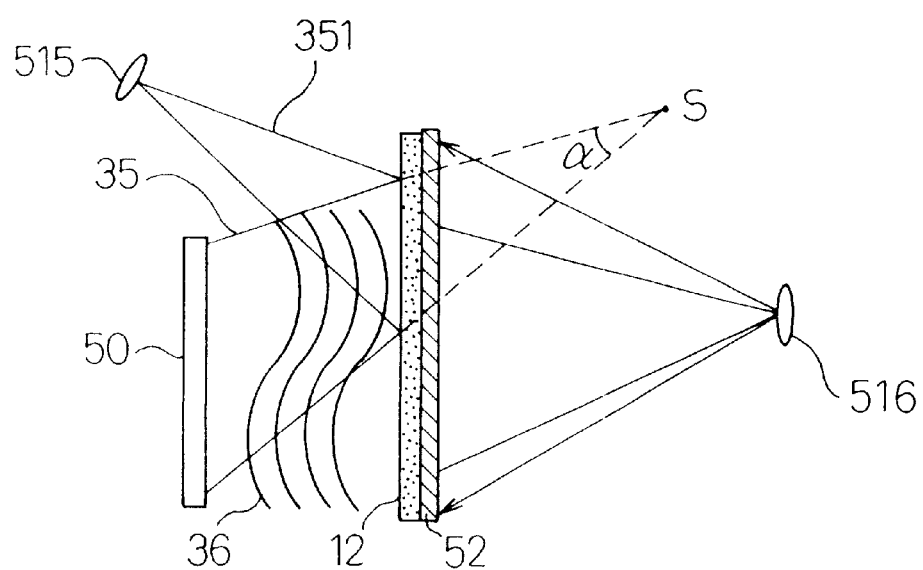
FIG. 29 is a partial schematic view illustrating a method for producing a transparent type hologram screen according to a twentieth embodiment of the present invention.

The twentieth embodiment shown in FIGS. 28 and 29 features a modification of the arrangement of the third embodiment shown in FIG. 6 in that a non flat mirror, such as a concave mirror or a convex mirror, is recorded on the Lippmann type hologram element.

In the operation of this embodiment, a far or near adjustment of an apparent position of the light sources viewed from the photosensitive member 50 (the position of the light source of the reference light 35 for an actual formation of an interference fringe on the photosensitive member) or wider or narrower adjustment of the angle α of the reference light can be desirably done. As shown in FIG. 28, position S of the light source can be at a distance in order to narrow the angle α. Or, as shown in FIG. 29, position S of the light source can be close to the light diffusing body in order to widen the angle α.

This embodiment is also advantageous in that a degree of the freedom as to the spatial arrangement of the light path of the reference light 35.

The remaining elements are the same as those in the eighteenth embodiment.

Figure 30:
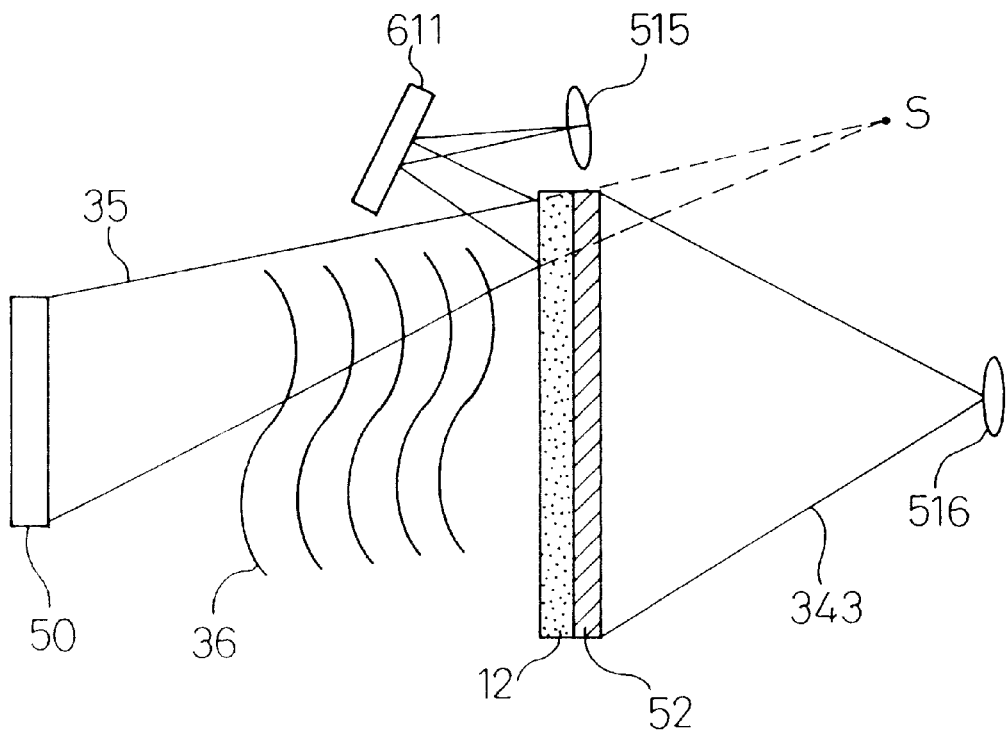
FIG. 30 is a partial schematic view illustrating a method for producing a transparent type hologram screen according to a twenty-first embodiment of the present invention.

A twenty-first embodiment shown in FIG. 30 features a modification of the arrangement of the third embodiment in FIG. 6 in that a reflective optical element 611 is arranged at a location between the lens 515 and the Lippmann type hologram element 12, while the light source (lens 515) of the reference light 35 to the photosensitive member 50 is prevented from facing the light diffusing body 52.

This embodiment is advantageous in that the degree of freedom as to the spatial arrangement of the light path of the reference light 35 is increased as in the seventeenth embodiment.

As for the reflective optical element 611, not only a mirror such as a flat, concave or convex mirror but also an element such as a Lippmann hologram can be used. By using such a Lippmann hologram, a desired far or close adjustment of the apparent position of the light source S is possible.

The remaining elements are the same as those in the eighteenth embodiment.

Figure 31:
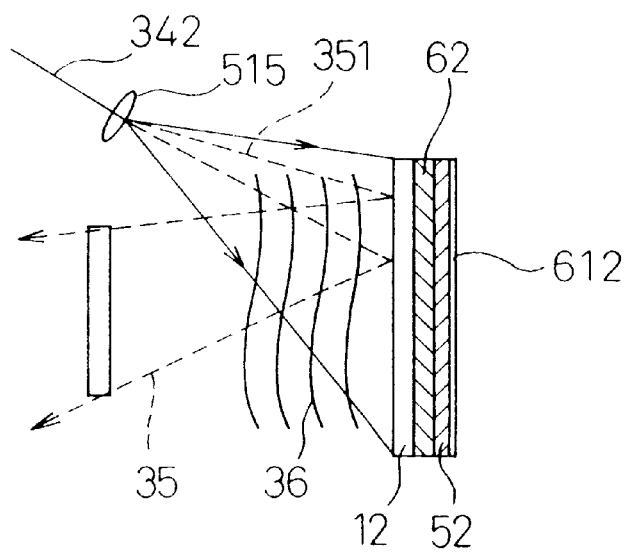
FIG. 31 is a partial schematic view illustrating a producing a transparent type hologram screen to a twenty-second embodiment of the present invention.

A twenty-second embodiment shown in FIG. 31 features a modification of the arrangement of the eighteenth embodiment in FIG. 26 in that in place of the half mirror 11, a Lippmann hologram 12 recorded with a non diffusing body, and a Lippmann hologram 62 recorded with a light diffusing body are used. The light diffusing body 52 is, at the rear side of the hologram element 62, formed with a mirror coat 612.

In the operation of this embodiment, the light reflected at the mirror coat is passed through the light diffusing body 52, thereby generating diffuse light. Thus, an object light 36 of an increased strength as well as an increased uniformity is obtained. As a result, an improved distributed state of the object light 36 is obtained, resulting in an improvement in a color characteristic.

The remaining elements are the same as those in the eighteenth embodiment.

Figure 32:
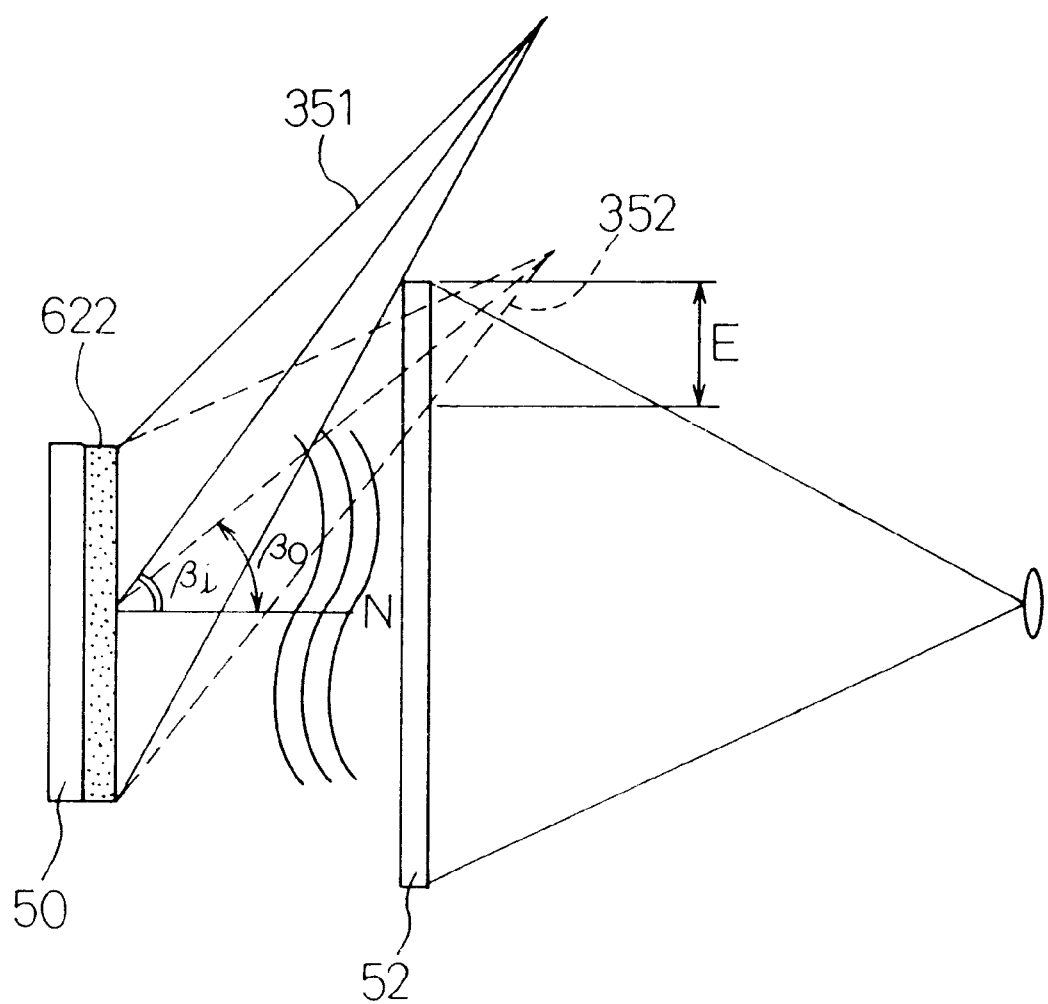
FIG. 32 is a partial schematic view illustrating a producing a transparent type hologram screen to a twenty-third embodiment of the present invention.

A twenty-third embodiment features that, in the method for executing an exposure of a transparent type hologram screen as shown in FIG. 2, a Fresnel type hologram optical element 622 is arranged on the front surface of the photosensitive member 50, as shown in FIG. 32.

When divergent light 351 is introduced to the optical element 622 at an angle Pi with respect to the normal line N, the Fresnal type hologram optical element 622 diffracts light 351 in a direction corresponding to diffracted light 352 (the light as a continuation of the dotted line) introduced at an angle P0 with respect to the normal line N. The diffracted light 352 corresponds to the reference light 35 in FIG. 2.

Due to the arrangement of the hologram 622 on the front surface of the photosensitive member 50, the divergent light 351 is diffracted by the hologram 622 to obtain a diffracted light 352 as the reference light, which is introduced into the photosensitive member 50. The divergent light 351 in FIG. 32 functions as the reference light 35 in FIG. 2, thereby providing an increased incident angle βi of the reference light over that β0 in the reference light 35 in FIG. 2. As a result, an increase of the size of the light diffusing body 52 for the length of E in FIG. 32 is obtained in comparison with the case with no hologram 622 in FIG. 2. Thus, an increase in the visible range of the hologram screen is obtained.

It should be noted that, during the reproduction process of the hologram screen in FIG. 32, the screen is illuminated by a light in the direction of the dotted line 352, i.e., at an angle of β0.

Furthermore, in the photosensitive member 50, a hologram is also created by the light passed therethrough without being diffracted at the hologram 622 as the second reference light. Thus, a final screen characteristic is a combination of a hologram created by the first reference light end a hologram created by the second reference light. Thus, an improvement of a color characteristic (a reproduced wave characteristic) of the hologram screen is obtained because the characteristics of the respective holograms are combined. Furthermore, by changing the incident angle during the reproduction process of the hologram at exposure, displacement of the reproducing wave length characteristic of the diffracted light is obtained.

A wider range of wave length characteristics are obtained because the different wave length characteristics are superimposed. Generally speaking, displacement of the wave length characteristic to a longer wavelength side is obtained when the angle during exposure is less than that at the reproduction process. Contrary to this, displacement of the wave length characteristic to a shorter wave length side is obtained when the angle during exposure is larger than that at the reproduction process.

Figure 33:
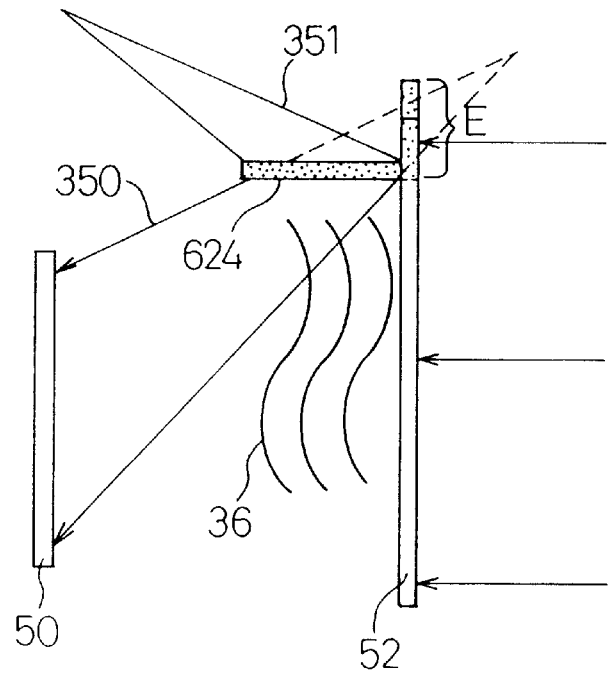
FIG. 33 is a partial schematic view illustrating a producing a transparent type hologram screen to a twenty-fourth embodiment of the present invention.

A twenty-fourth embodiment shown in FIG. 33 features that, in the end of the light diffusing body 52 adjacent the side where the reference light 35 as shown in FIG. 2, a Fresnel type hologram element 624 extends toward the photosensitive member 50 so that the reference light351 as introduced into the Fresnel type hologram element 624 is diffracted toward the photosensitive member 50, thereby generating a divergent light 350 directed toward the photosensitive member 50. It should be noted that the characteristic and the arrangement of the Fresnel type hologram element 624 is such that the divergent light 350, including the light indicated by a dotted line in FIG. 33, corresponds to the reference light 35 in FIG. 2.

In this structure, by suitably adjusting the characteristic and the arrangement of the Fresnel type hologram element 624, an incident direction and an aperture angle of the reference light 351 during the exposure process as well as a direction of the projecting light and an aperture angle with respect to the screen during the reproduction process as shown by dotted line in FIG. 33, can be desirably varied. As a result, the degree of freedom of setting an optical system constructing the objectlight36 is increased. An increase in the size of the light diffusing body 52 of length E or more in FIG. 33 as compared to that in FIG. 2 increases the incident angle range of the object light 36 to the photosensitive member 50, and thereby widens the visible area of the hologram screen.

The remaining elements are the same as those in the first embodiment.

Figure 34:
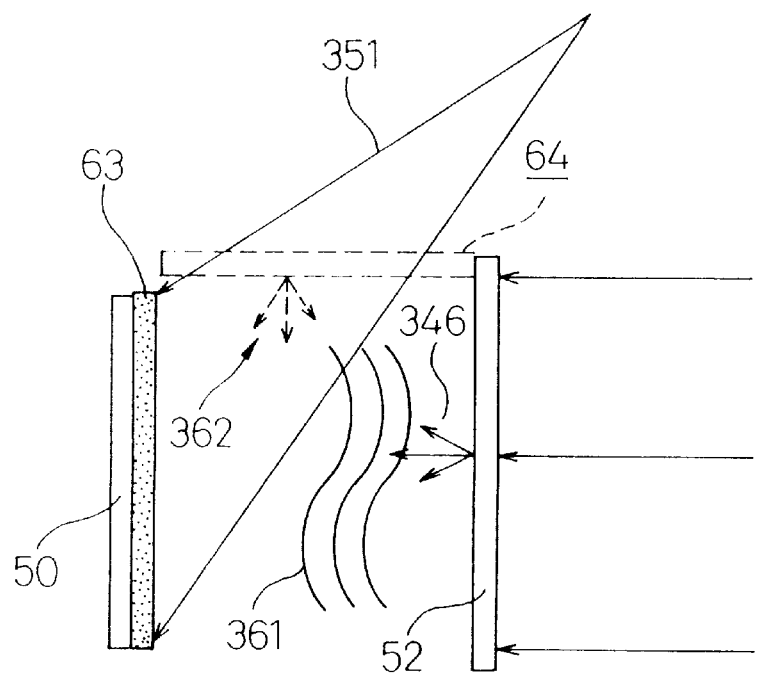
FIG. 34 is a partial schematic view illustrating a method for producing a transparent type hologram screen according to a twenty-fifth embodiment of the present invention.

A twenty-fifth embodiment shown in FIG. 34 features a method for producing a hologram screen of a transparent type wherein a transparent Fresnel type hologram element 63 is arranged at the front surface of the photosensitive member 50, while the hologram element 63 is illuminated on its front surface by a divergent light 351 and the diffuse light 346 passed through the light diffusing body 52.

Figure 35:
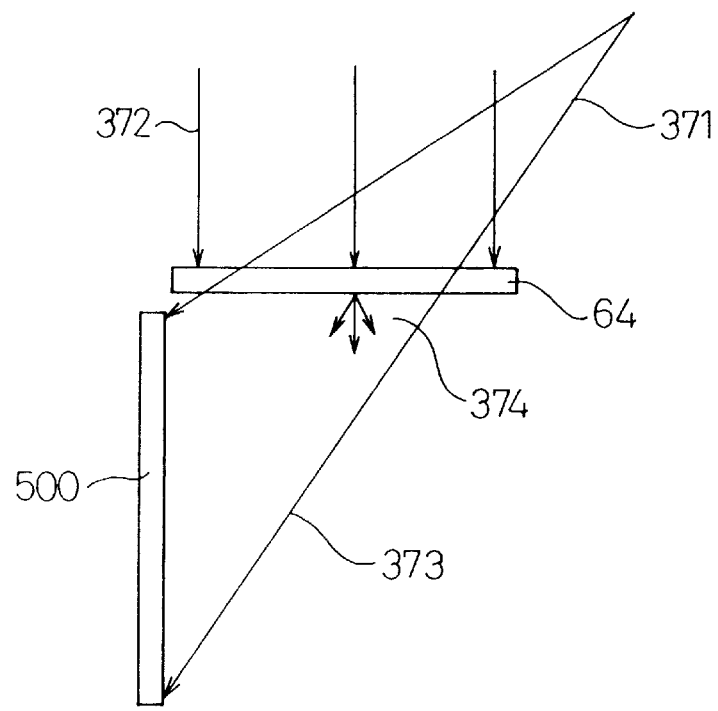
FIG. 35 is schematic view illustrating a method for an exposure of a Fresnel type hologram in FIG. 34.

In this embodiment, the hologram element 63 is the one as obtained by the optical arrangement in FIG. 35. In this arrangement, the photosensitive member 500 is located in the same place as the hologram element 63 in FIG. 34, in which a light diffusion body 64, of a suitable directivity is used so that the first incident light 371, corresponding to the divergent light 351 in FIG. 34, passes without changing its direction, while the second incident light 371 in a different direction is scattered.

Then, in an arrangement shown in FIG. 34, the divergent light 351 is partly passed through the hologram element 63 as the reference light, while a light diffused at the light diffusing body 52 and passed through the hologram element 63 becomes a first object light, while the divergent light 351 partly diffused at the hologram element 63 becomes a second object light. Thus, a hologram is generated by the reference and object lights.

In order to produce the Fresnel type hologram element 63, a light diffusion body 64 (FIG. 36) is arranged transversely to the photosensitive member 500. The light diffusion body 64 has a directivity such that a light 371 in a predetermined incident direction is passed therethrough in a straight manner while providing a strong scattering property to the light in a direction other than the predetermined direction, in particular, transversely introduced light 372. A hologram is obtained by using the light 373 passed straight through the light diffusion body 64 as a reference light end the scattered light 374 as the object light.

As a result, the hologram element 63 allows the divergent light 351 to partially pass through as it is, so that a light having a light directivity is reproduced at a position as shown by the dotted line in FIG. 34 by a part of the divergent light 351 and allows a diffraction characteristic to be generated which allows the diffuse light 362 to be directed to the photosensitive member 50. Furthermore, due to the generation of such a second diffuse light 362, a similar result is achieved when the incident angle of the object light (diffuse light) to the photosensitive member is made wider or when the light diffusing body 52 for the formation of the object light is extended upwardly. Thus, a hologram screen of an increased visible area is generated in the photosensitive member.

The remaining elements are the same as those in the first embodiment.

Figure 36:
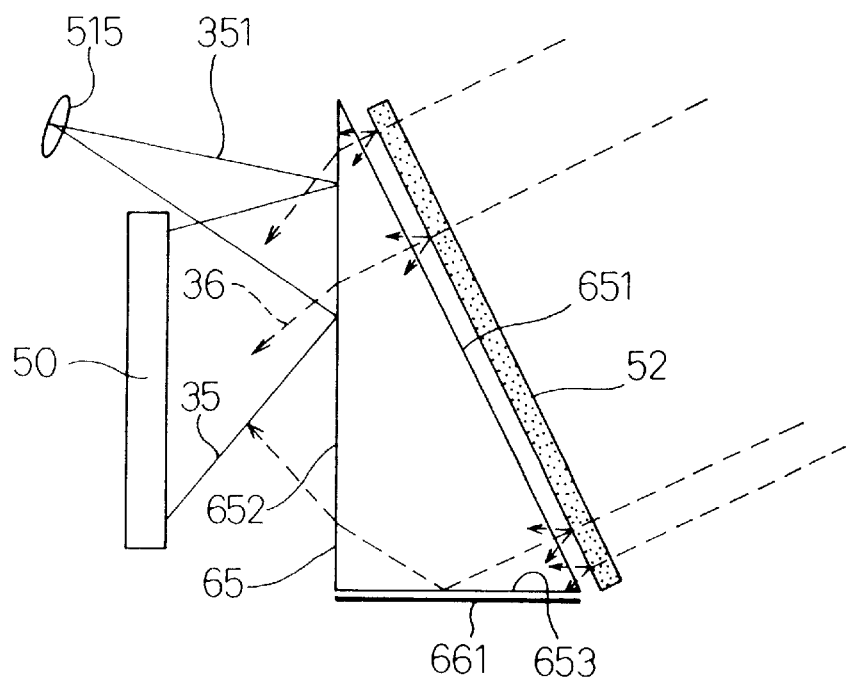
FIG. 36 is a partial schematic view illustrating a method for producing a transparent type hologram screen according to a twenty-sixth embodiment of the present invention.

FIG. 36 shows a twenty-sixth embodiment of a method for producing a hologram screen in which the photosensitive member 50 is, on the same side, illuminated by the diffuse light passed through the light diffusing body 52 as a object light 36 and the divergent light 351 not passed through the light diffusing body 52 as a reference light 35, featuring that, between the light sources of the reference light 35 and object light 36, a prism 65 is arranged having boundary surfaces 651 to 653 of a desired reflectivity or transparency.

In the operation of this embodiment, the diffuse light passed through the light diffusing body 52 is deflected in desired directions at the boundary surfaces 651 to 653 to obtain an object light, while the divergent light 351 is deflected at the boundary surface 652 to a desired direction to obtain a reference light and a hologram is created on the photosensitive member by the reference and object lights 35, 36.

In more detail, a light diffusing body 52 is arranged in front of the first boundary 651 of the prism 65, a reflection film is formed on the second boundary 652 which is faced with the photosensitive member 50 and a mirror coating 661 is formed on the third boundary 653.

In this arrangement, by providing the reflecting film coat on the second boundary, the desired intensity is maintained. Also, while the inclined angle of the second boundary 652 is adjusted with respect to the photosensitive member, the direction of the divergent light 351 is adjusted. Furthermore, the diffuse light introduced via the first boundary 651 is deflected to the direction of the photosensitive member 50 by means of the mirror coating 661, to be introduced into the photosensitive member 50 at a wide angle. Furthermore, the mirror coating 661 also deflects the diffuse light from the first boundary 651 toward the photosensitive member 50, thereby reducing the leakage of the diffuse light in the direction other than to that of the photosensitive member 50. In short, an increase in an efficiency of the use of the light is obtained by the mirror coating 661.

The remaining elements are the same as those in the first embodiment.

Figure 37:
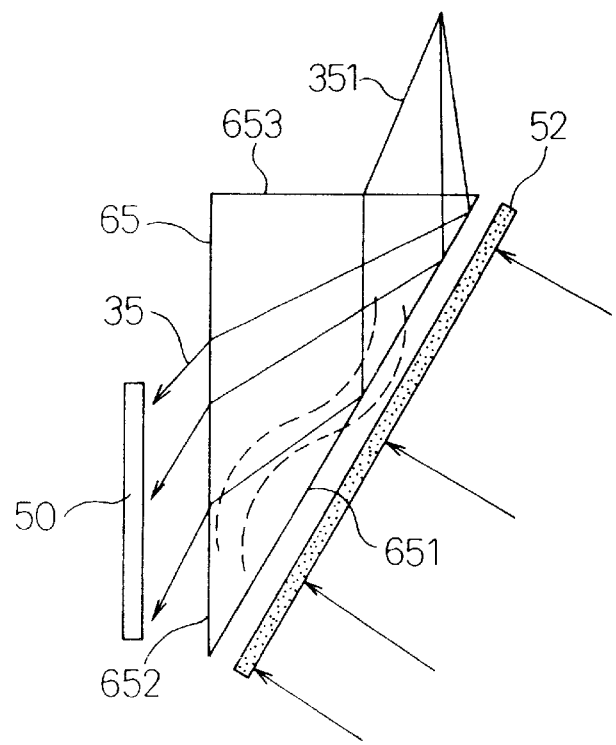
FIG. 37 is a partial schematic view illustrating a method for producing a transparent type hologram screen according to a twenty-seventh embodiment of the present invention.

In a twenty-seventh embodiment, as shown in FIG. 37, the divergent light 351 of the first light source is introduced into the prism 65 via the third boundary 653 of the prism 65, is reflected at the first boundary 651, and is discharged from the second boundary surface 652 toward the photosensitive member. In this arrangement, the incident angle of the divergent light 351 introduced into the first boundary 651 conforms to the total internal reflection angle. Thus, substantially 100% of the reflection of the light is obtained at the boundary 651, thereby largely reducing the loss of light.

In this embodiment, the divergent light 351 is introduced into the boundary 651, which is parallel to the light diffusing body 52, and is deflected and reflected toward the photosensitive member 50. Thus, in comparison with the structure in FIG. 2, where the divergent light is directly directed to the photosensitive member, the degree of freedom of the arrangement of the light path is increased. Thus, a formation of the light path for the reference light is easy even if the size of the light diffusing body 52 is increased, i.e., the production of a hologram screen of an increased visible area is easy.

The remaining elements are the same as those in the first embodiment.

Figure 38:
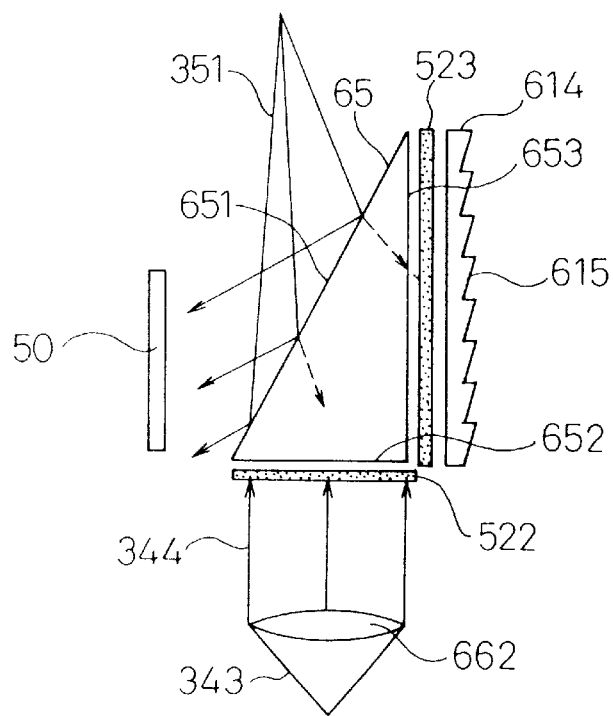
FIG. 38 is a partial schematic view illustrating a method for producing a transparent type hologram screen according to a twenty-eighth embodiment of the present invention.

In a twenty-eighth embodiment, as shown in FIG. 38, on the second and third boundary surfaces 652, 653 of the prism 65, light diffusing bodies 522, 523 are arranged, respectively, and, on the first boundary surface 651, a reflective coating is formed. The light sources are arranged with respect to the photosensitive member 50 so that the divergent light 351 as the first light source is reflected at the first boundary surface 651 to obtain a reflection light as a reference light directed to the photosensitive member. In this arrangement, a parallel light 344 is introduced into the first light diffusing body 522 from its front surface, while, on the rear surface of the second light diffusing body 523, a prism sheet 614 having a mirror coating at a serrated boundary is arranged. A collimating lens 662 in front of the light diffusing body 522 is for converting the divergent light to a parallel light, which is introduced into the light diffusing body 522.

Figure 39:
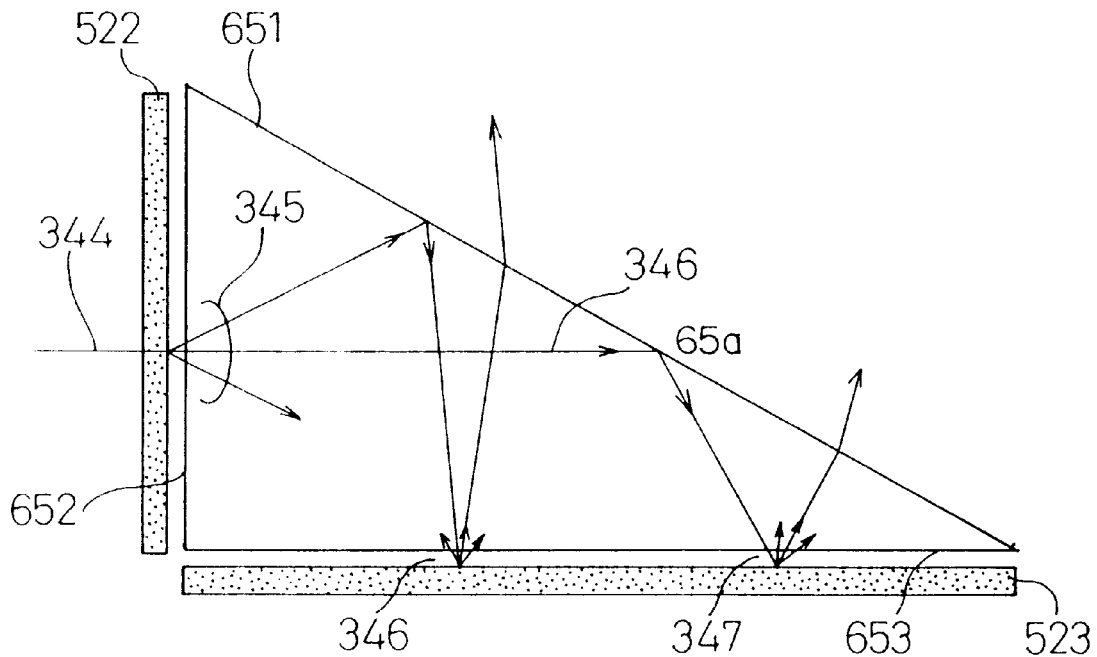
FIG. 39 is a schematic view illustrating a light path of an object light in a prism in the twenty-eighth embodiment in FIG. 38.

In FIG. 39, which is an enlarged view of the prism 65 in FIG. 38, almost of the all of the diffuse light passed through the first light diffusing body 522 is reflected at the first boundary surface 651 and is introduced into the second light diffusing body 523. The light introduced into the light diffusing body 523 is partly scattered as shown by numerals 346 and 347, and is, via the prism 65, introduced into the photosensitive member 50 as a first object light. The remaining part reflected at the first boundary surface 651 passes through the second light diffusing body 523, is reflected at the serrated mirror coat 615 of the prism sheet 615, is again introduced into the second light diffusing body, is again scattered, and is passed through the prism 65 as a second object light, which is introduced into the photosensitive member 50.

Figure 40:
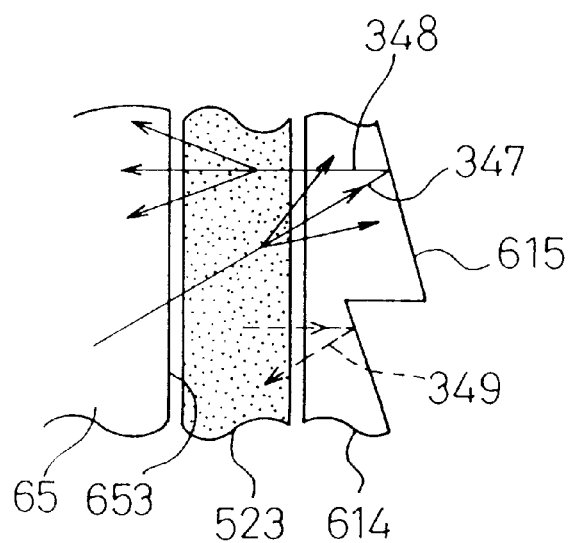
FIG. 40 is a schematic view illustrating a light path of a reflected light at a mirror coat for generating a second object light in the twenty-eighth embodiment in FIG. 38.

The serrated mirror coat 615 of the prism sheet has a stepped series of angled surfaces as shown in FIG. 40, and the angle is such that the light 347, which has been passed through the first light diffusing body 522 without being diffused as shown by 346 in FIG. 39, is regularly reflected at the first boundary surface 65a, finally passes through the second light diffusing body 523 without being diffused, and is reflected and introduced normally to the second light diffusing body 523 as shown by 348 in FIG. 40.

The light 348 reflected at the inclined surface of the mirror coat 615 is diffused at the second light diffusing body 523, is passed through the prism 65, and is introduced into the photosensitive member as a second object light. The second light diffusing body 523 works with the first light diffusing body 522 and the prism sheet as explained above, for a uniform distribution of light introduced into the photosensitive member.

In the absence of the first light diffusing body 522, the diffuse light obtained by the second light diffusing body 523 will be localized to a direction for a regular reflection of an incident light. The provision of the first light diffusing body 522 causes a diffusion of the light to be generated. In other words, many incident angles of light are obtained, thereby preventing the distribution of the diffuse light from being localized.

In view of the above, the first light diffusing body 522 improves the distribution of the diffuse light. However, in the distribution of the intensity of the light reflected by the second light diffusing body 523, the intensity in the direction toward the first light diffusing body 522 is still insufficient, i.e., has deviated from the desired distribution characteristic. It is the prism sheet 614 that improves the distribution characteristic. The inclined surface of the mirror coat 615 transversely directs the regularly reflected light component of an increased intensity to the second light diffusing body 523. However, a suitable angle selection allows the reflected light to be rotated toward the first light diffusing body 522 as shown by a dotted line. As a result, a further improvement is obtained in the distribution of the diffuse light by the second light diffusing body 523.

Furthermore, a reflection of the light by the mirror coat 615 serves to reduce loss of light to the outer side.

Finally, in this embodiment, the direction of the referencelight351 as the first light source and the direction of the incident light 343 as the second light source are substantially opposite. As a result, an improvement is obtained as to the degree of freedom of the spatial arrangement of the first and second light sources, which is otherwise occurred in the arrangement in the prior art as shown in FIG. 2.

The remaining elements are the same as those in the first embodiment.

Figure 41:
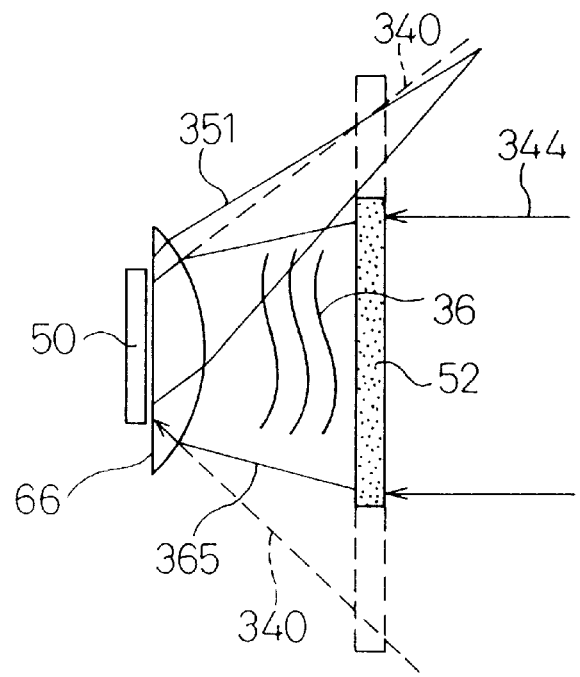
FIG. 41 is a partial schematic view illustrating a method for producing a transparent type hologram screen according to a twenty-ninth embodiment of the present invention.

FIG. 41 shows a twenty-ninth embodiment of a method for producing a transparent type hologram screen, in which the photosensitive member 50 is, on the same side, illuminated by the diffuse light passed through the light diffusing body 52, as an object light emitted to the photosensitive member 50, and the divergent light 351, as a reference light not passed through the light diffusing body 52. The method features a convex lens 66 arranged in front of the photosensitive member 50, which is for diverging the incident light, thereby obtaining a further wider angle of the incident light to the photosensitive member.

Due to the operation of the convex lens 66, the incident light 365 to the photosensitive member is equivalent to the light that is provided by the light 340 as shown by dotted line. As a result, an effect is obtained, similar to when the area of the light diffusing body is increased as shown by the dotted line or the light diffusing body is located closer, thereby allowing a hologram screen of an increased visible area to be produced.

The remaining elements are the same as those in the first embodiment.

Figure 42:
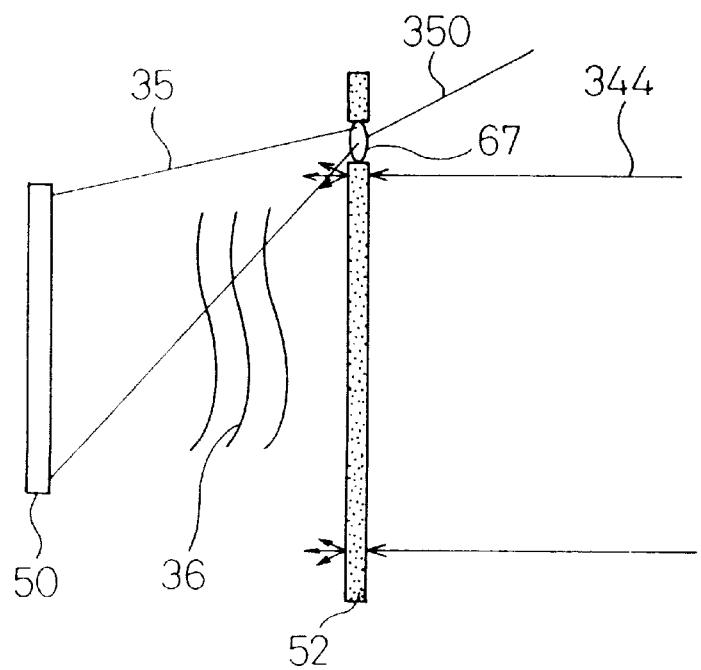
FIG. 42 is a partial schematic view illustrating a method for producing a transparent type hologram screen according to a thirtieth embodiment of the present invention.

FIG. 42 shows a thirtieth embodiment of a method, for producing a transparent type hologram screen, in which the photosensitive member 50 is, on the same side, illuminated by the diffuse light passed through the light diffusing body 52 is as an object light emitted to the photosensitive member 50 and the divergent light 351 as a reference light not passed through the light diffusing body 52, featuring that the light diffusing body 52 is formed with an opening in which an object lens 67 is attached, and a light as a reference light 35 is passed through the object lens 67.

In this embodiment, a beam from a light source is transformed into a divergent light at the object lens 67 to provide a reference light 35. Contrary to this, a parallel light 344 is introduced into the light diffusing body 52 so that the light is passed through the light diffusing body, thereby providing a diffuse light as an object light 36.

In this embodiment, the lens 67 is illuminated by a beam 350 for forming a reference light, thereby preventing the reference light from being scattered or weakened by the light diffusing body 52. As a result, a reduction in the loss of the reference light, thereby increasing energy efficiency, makes it easy to design the light path and improves the light intensity.

Furthermore, in case where the divergence point of the reference light 35 is located near to the photosensitive member, i.e., the projecting light source is located near to the screen, it makes it easy for the light diffusing body to be located near to the photosensitive member, thereby making it easy to produce a hologram screen of a wide visible range.

Finally, the location of the reproduction of the hole on the screen is equal to a position of the light source during the reproduction process. Thus, a desired function of the screen is maintained irrespective of an existence of the hole on the reproduced image.

The remaining elements are the same as those in the first embodiment.

We claim:

1. A method for producing a transparent holographic diffusion screen, said method comprising:

spacing a photosensitive member away from a light diffusing body;

positioning a half mirror between said light diffusing body and said photosensitive member, a reflecting surface of said half mirror facing said photosensitive member;

passing a first light through said light diffusing body and said half mirror to obtain diffuse light used as an object light;

reflecting a second light off said half mirror to obtain a reference light incident to said photosensitive member; and exposing said photosensitive member to said object light and said reference light on the same side of said photosensitive member to produce a hologram on which said light diffusing body is recorded.

2. A method for producing a transparent holographic diffusion screen, said method comprising:

spacing a photosensitive member away from a light diffusing body;

positioning a Lippmann type hologram element between said light diffusing body and said photosensitive member, said Lippman type hologram element capable of reflecting a reference light, regularly or irregularly;

passing a light through said light diffusing body and said Lippmann type hologram element to obtain diffuse light used as an object light;

reflecting a second light, regularly or irregularly, on said Lippman type hologram element to obtain a light incident to said photosensitive member, said incident light used as a reference light; and exposing said photosensitive member to said object light and said reference light on the same side of said photosensitive member to produce a hologram on which said light diffusing body is recorded.

3. A method for producing a transparent holographic diffusion screen, said method comprising:

positioning a transparent light diffusing body, in a light path to a photosensitive member, said transparent light diffusion body having directivity such that only light in a predetermined range of an incident angle is subject to diffusion;

passing a light in said incident angle range through said light diffusing body to obtain a diffuse light used as an object light;

passing a second light outside said incident angle range through said light diffusing body to obtain non-diffuse light used as a reference light; and exposing said photosensitive member to said object light and said reference light on the same side of said photosensitive member to produce a hologram on which said light diffusing body is recorded.

4. A method for producing a transparent holographic diffusion screen, said method comprising:

positioning a Fresnel type hologram element on which a light diffusing body is recorded in a light path to a photosensitive member, said Fresnel type hologram element having a curved shape;

positioning said photosensitive member at a center of a curvature of said curved shape;

diffracting a light at said Fresnel type hologram element to obtain diffuse light used as an object light;

passing a second light through said Fresnel type hologram element to obtain non-diffuse light used as a reference light; and exposing said photosensitive member to said object light and said reference light on the same side of said photosensitive to produce a hologram on which said light diffusing body is recorded.

5. A method for producing a transparent holographic diffusion screen, said method comprising:

positioning a Lippmann type hologram element on which a light diffusion body is recorded, in a light path to a photosensitive member, said Lippmann type hologram element having a curved shape;

positioning said photosensitive member at a center of a curvature of said curved shape;

diffracting and reflecting a light by said Lippmann type hologram element to obtain diffuse light used as an object light, said light being divergent light from an opposite side of said photosensitive member;

passing a second light through said Lippmann type hologram element to obtain non-diffuse light used as a reference light; and exposing said photosensitive member to said object light and said reference light on the same side of said photosensitive member to produce a hologram on which said light diffusing body is recorded.

6. A method for producing a transparent holographic diffusion screen, said method comprising:

positioning a first transparent hologram element and a second transparent hologram element in a light path to a photosensitive member, said second hologram element being closer to said photosensitive element than said first hologram element;

said first hologram element being a Lippmann type hologram element on which a light diffusion body is recorded;

said second hologram element being a Lippmann type hologram on which a plane mirror is recorded;

passing a light through said first and second holograms elements to obtain a non-diffuse light used as a reference light;

passing a second light through said first hologram element, reflecting said second light partly at said second hologram element onto said first hologram element, reflecting said second light again at said first hologram element to obtain diffuse light used as an object light to reproduce said recorded light diffusing body, and passing said second light through said second hologram element onto said photosensitive member; and exposing said photosensitive member to said object light and said reference light on the same side of said photosensitive member to produce a hologram on which said light diffusing body is recorded.

7. A method for producing a transparent holographic diffusion screen, said method comprising:

spacing a photosensitive member away from a light diffusing body;

providing a reflective optical element located at an end of said light diffusing body adjacent to a light path for a reference light, said reflective optical element extends parallel to or at an angle to said light diffusing body from said end toward said photosensitive member;

said reflective optical element having a function that a part of said diffuse light passes through said light diffusing body is partly reflected at said reflective optical element;

passing a light through said light diffusing body and onto said photosensitive member and reflecting a light at said reflective optical element and onto said photosensitive member to obtain a diffuse light used as an object light;

diverging a light used as a reference light; and exposing said photosensitive member to said object light and said reference light on one side to produce a hologram on which said light diffusing body is recorded.

8. A method as claimed in claim 7, wherein said reflective optical element comprises a transparent element through which said diverging light partly passes, said reflective optical element positioned across a light path of said reference light to said photosensitive member.

9. A method for producing a transparent holographic diffusion screen, said method comprising:

spacing a photosensitive member away from a light diffusing body;

providing a convex lens at a front surface of said photosensitive member, thereby increasing an incident angle to said photosensitive member;

passing a light through said light diffusing body to obtain a diffuse light used as an object light;

diverging a second light used as a reference light directly to said photosensitive member without passing through said light diffusing body; and exposing said photosensitive member to said object light and said reference light on the same side of said photosensitive member to produce a hologram on which said light diffusing body is recorded.

10. A method for producing a transparent holographic diffusion screen, said method comprising:

spacing a photosensitive member away from a light diffusing body;

providing a Fresnel type hologram element in front of said photosensitive member, said Fresnel type hologram element having a function of diffracting divergent light toward said photosensitive member at an angle of a diffracted light with respect to the normal line of an outlet surface of said diffracted light which is less than an angle of an incident light with respect to the normal line of an inlet surface;

diffracting a divergent light used as a reference light by said Fresnel type hologram element;

passing a second light through said light diffusing body and said Fresnel type hologram element to obtain diffuse light used as an object light; and exposing said photosensitive member to said object light and said reference light on the same side of said photosensitive member to produce a hologram on which said light diffusing body is recorded.

11. A method for producing a transparent holographic diffusion screen, said method comprising:

spacing a photosensitive member away from a light diffusing body;

providing a Fresnel type hologram element located on an inner portion of said light diffusing body, closer in than an end of said light diffusing body adjacent to a light path for a reference light, said Fresnel type hologram element projecting vertically or at an angle from said light diffusing body to said photosensitive member;

positioning said Fresnel type hologram element across said light path for said reference light, said Fresnel type hologram element having a function of diffracting divergent light toward said photosensitive member, and said diffracted light projected at said photosensitive member at an angle similar to a reproduction light of a hologram screen;

diffracting a light used as a reference light by said Fresnel type hologram element;

passing a second light through said light diffusing body and onto said photosensitive member to obtain diffuse light used as an object light; and exposing said photosensitive member to said object light and said reference light on the same side of said photosensitive member to produce a hologram on which said light diffusing body is recorded.

12. A method for producing a transparent holographic diffusion screen, said method comprising:

spacing a photosensitive member away from a light diffusing body;

providing a transparent Fresnel type hologram element at a front surface of said photosensitive member so that a divergent light may be introduced to said photosensitive member without passing through said light diffusing body;

recording a second light diffusing body, which is reproduced in a light path for said divergent light by said divergent light on said transparent Fresnel type hologram element, and which is not arranged in the structure of a system for exposure, said second light diffusing body having directivity that allows an incident light in a direction to be diffused, while said incident light from a different direction is not diffused, but passes directly through;

passing a first light through said light diffusing body and said transparent Fresnel type hologram element to obtain a diffuse light used as a first light;

passing a second light through said light diffusing body and diffracting said second light partly at said transparent Fresnel type hologram element to obtain said diffused light used as a second object light;

passing a third light through said transparent Fresnel type hologram element to obtain said divergent light used as a reference light; and exposing said photosensitive member to said object light and said reference light on the same side of photosensitive member to produce a hologram on which said light diffusing body is recorded.

13. A method for producing a transparent holographic diffusion screen, said method comprising:

spacing a photosensitive member away from light diffusing body;

providing a prism between said photosensitive member and light diffusing body in a light path of a reference light and an object light, said prism having boundaries of desired respective characteristics for reflection or transparency such that a diffuse light passed through said light diffusing body is incident upon said photosensitive member as said object light after a direction of said diffuse light passing through said prism is changed at a corresponding boundary in said prism, while a divergent light reflects off the surface of said prism without passing through said light diffusing body and is incident upon said photosensitive member as a reference light; and exposing said photosensitive member to said object light and said reference light on one side to produce a hologram on which said light diffusing body is recorded.

* * * * *